US011646009B1

(12) United States Patent
Chhetri et al.

(10) Patent No.: US 11,646,009 B1
(45) Date of Patent: May 9, 2023

(54) AUTONOMOUSLY MOTILE DEVICE WITH NOISE SUPPRESSION

(71) Applicant: Amazon Technologies, Inc., Seattle, WA (US)

(72) Inventors: Amit Singh Chhetri, Sunnyvale, CA (US); Navin Chatlani, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 16/902,476

(22) Filed: Jun. 16, 2020

(51) Int. Cl.
| | |
|---|---|
| *G10L 25/84* | (2013.01) |
| *G10K 11/175* | (2006.01) |
| *G10L 15/16* | (2006.01) |

(52) U.S. Cl.
CPC .......... *G10K 11/1752* (2020.05); *G10L 15/16* (2013.01); *G10L 25/84* (2013.01)

(58) Field of Classification Search
CPC ..... G10K 11/1752; G10L 15/16; G10L 25/84; G10L 15/20; G10L 15/22; G10L 2021/02082; G10L 2021/02166; G10L 21/0208; G10L 21/0232; G10L 2015/088; G10L 15/08; G10L 25/18; G10L 25/21; G10L 25/27; G10L 25/51
See application file for complete search history.

(56) References Cited

U.S. PATENT DOCUMENTS

| | | | |
|---|---|---|---|
| 9,972,339 B1 * | 5/2018 | Sundaram | G10L 25/30 |
| 2014/0236582 A1 * | 8/2014 | Raychowdhury | G06F 17/142 704/205 |
| 2015/0248895 A1 * | 9/2015 | Matsumoto | G10L 25/84 704/206 |
| 2015/0379992 A1 * | 12/2015 | Lee | G06F 1/3206 704/275 |
| 2017/0148433 A1 * | 5/2017 | Catanzaro | G06N 3/084 |
| 2017/0361468 A1 * | 12/2017 | Cheuvront | A47L 9/2805 |
| 2018/0033449 A1 * | 2/2018 | Theverapperuma | G10L 21/028 |
| 2018/0261225 A1 * | 9/2018 | Watanabe | G10L 15/16 |
| 2019/0096230 A1 * | 3/2019 | Tanabe | H04W 4/90 |
| 2019/0179147 A1 * | 6/2019 | Ichimura | G10L 25/78 |
| 2019/0333494 A1 * | 10/2019 | Park | G10L 21/0216 |
| 2020/0066260 A1 * | 2/2020 | Hayakawa | G10L 15/22 |
| 2020/0160853 A1 * | 5/2020 | Kishi | G10L 15/20 |
| 2021/0090549 A1 * | 3/2021 | Lombardo | G10L 25/18 |
| 2021/0360349 A1 * | 11/2021 | Nyayate | G10L 21/0232 |
| 2022/0223144 A1 * | 7/2022 | Sun | G10L 21/0272 |

\* cited by examiner

*Primary Examiner* — Abdelali Serrou
(74) *Attorney, Agent, or Firm* — Pierce Atwood LLP

(57) ABSTRACT

A device capable of autonomous motion may move in an environment and may receive audio data from a microphone. A model may be trained to process the audio data to determine mask data, which may be used to mask noise in the audio data. Training data for the model may be normalized before training, and different loss functions may be used for different types of training data.

18 Claims, 26 Drawing Sheets

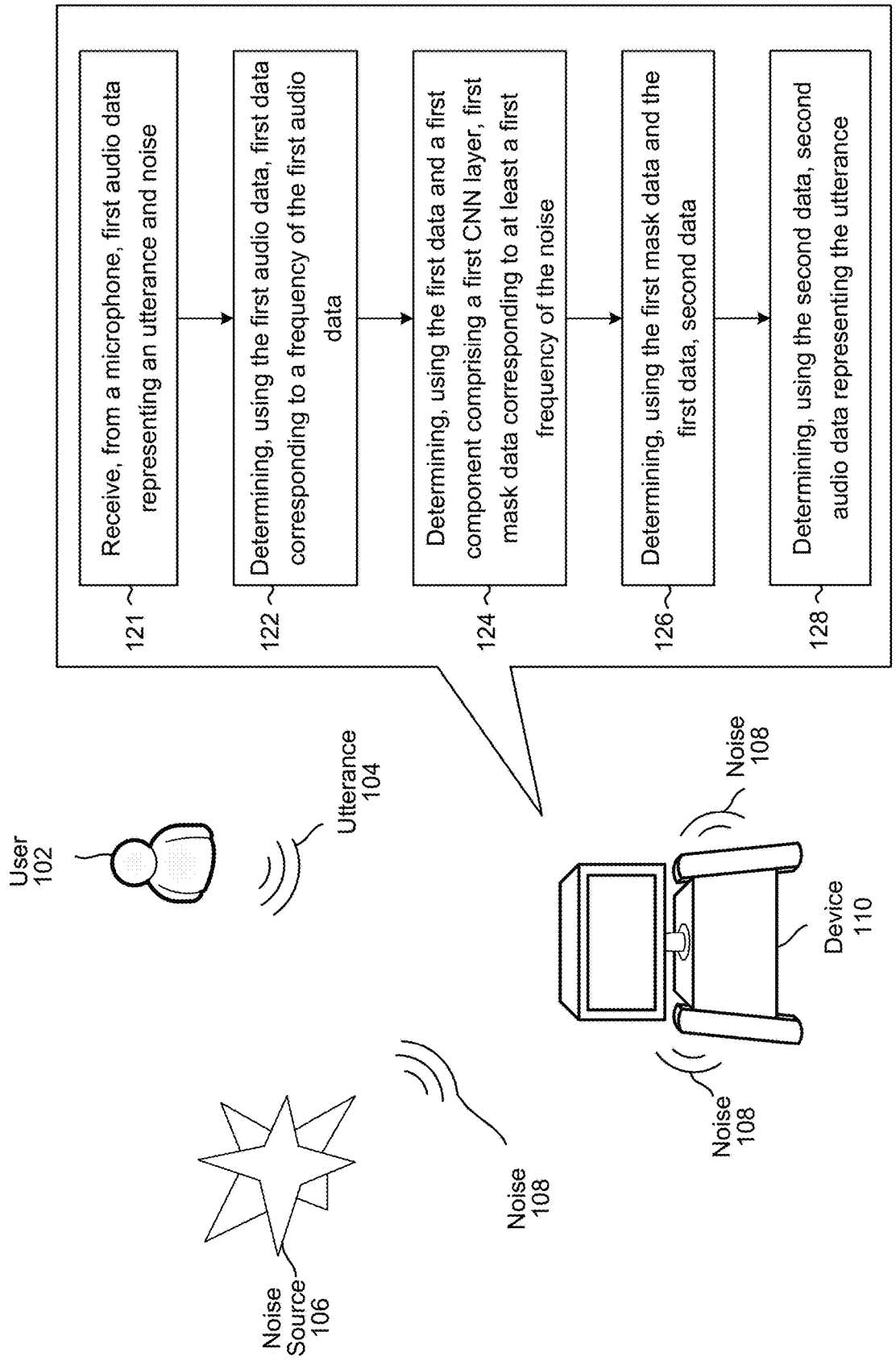

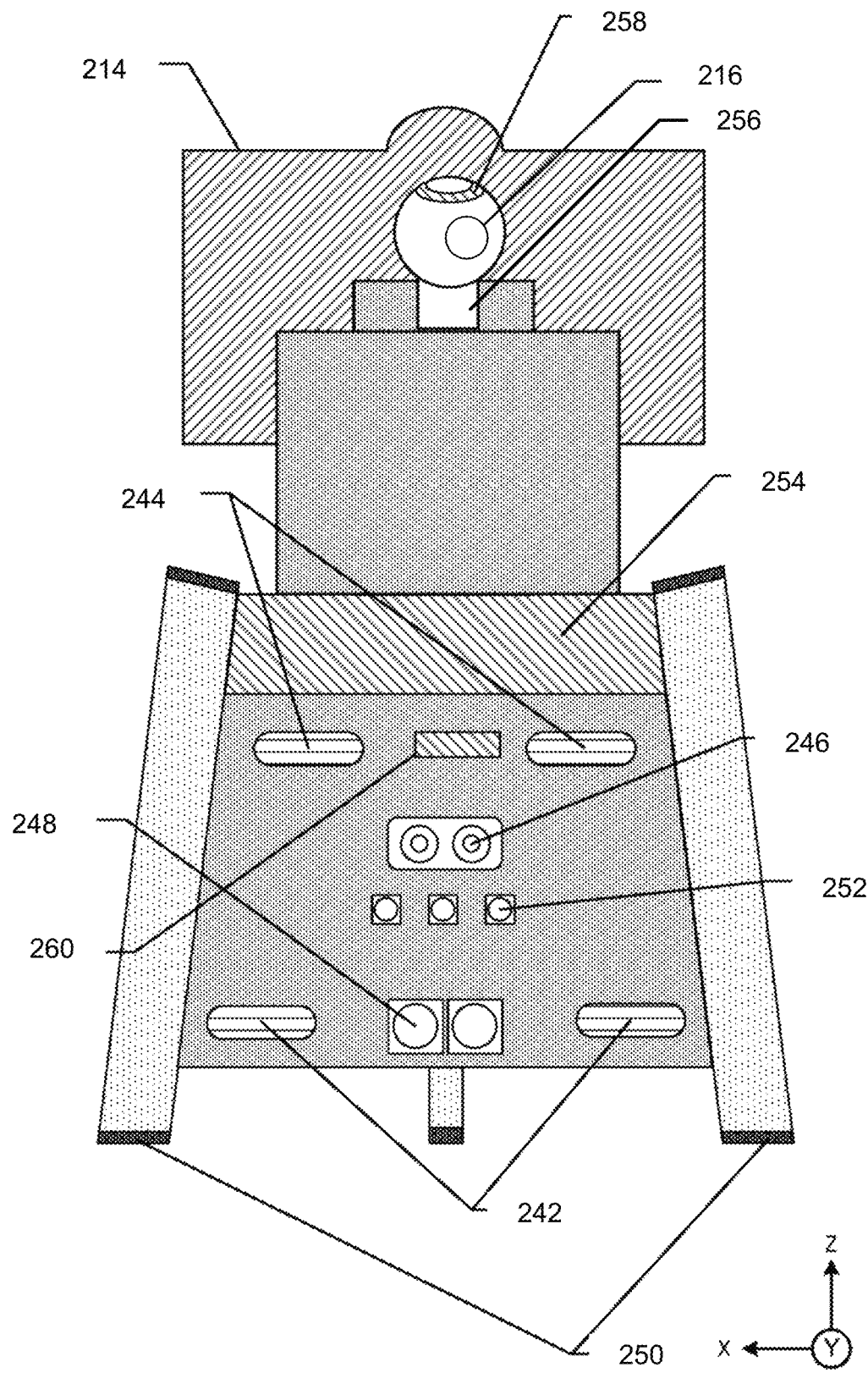

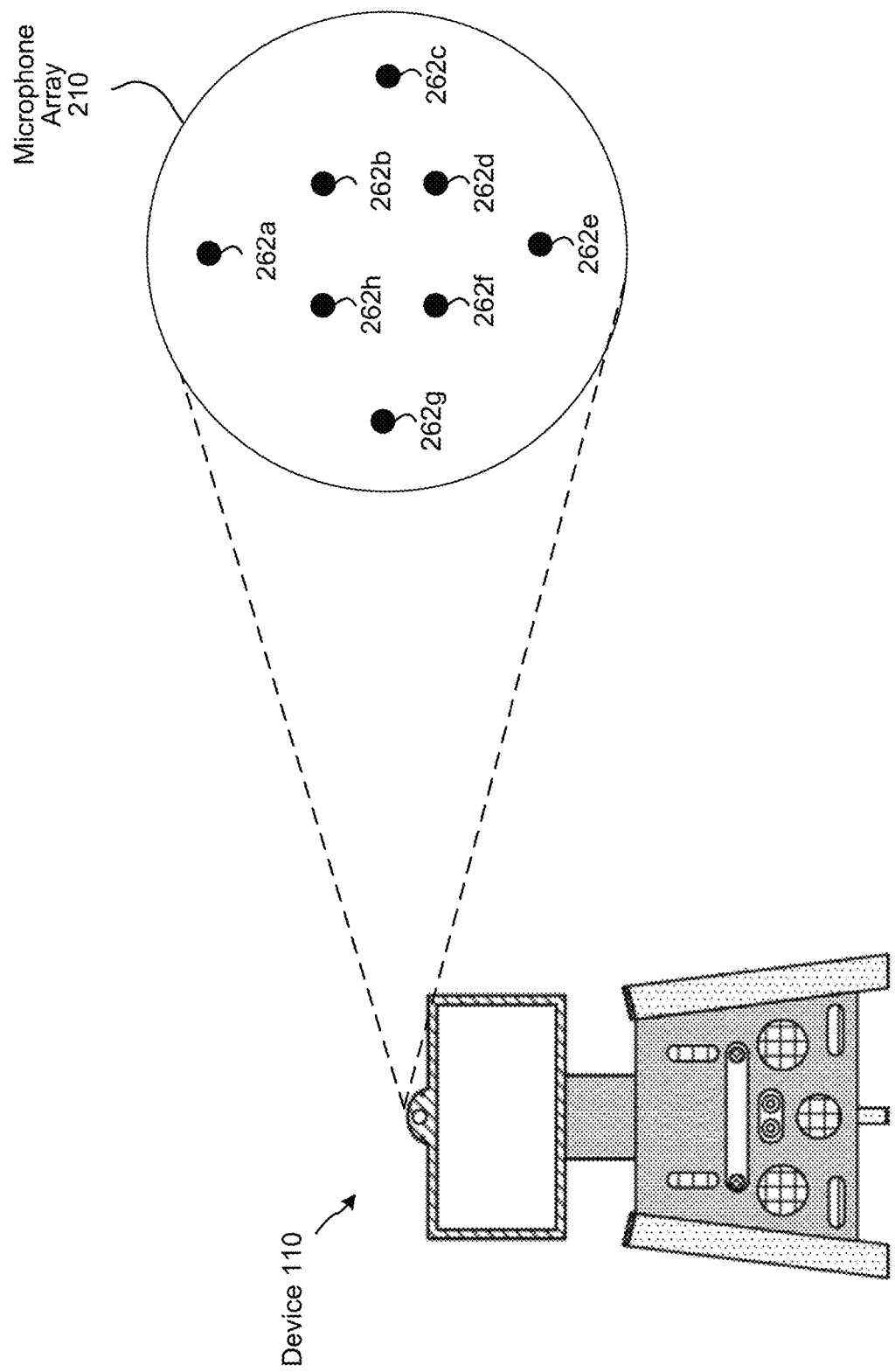

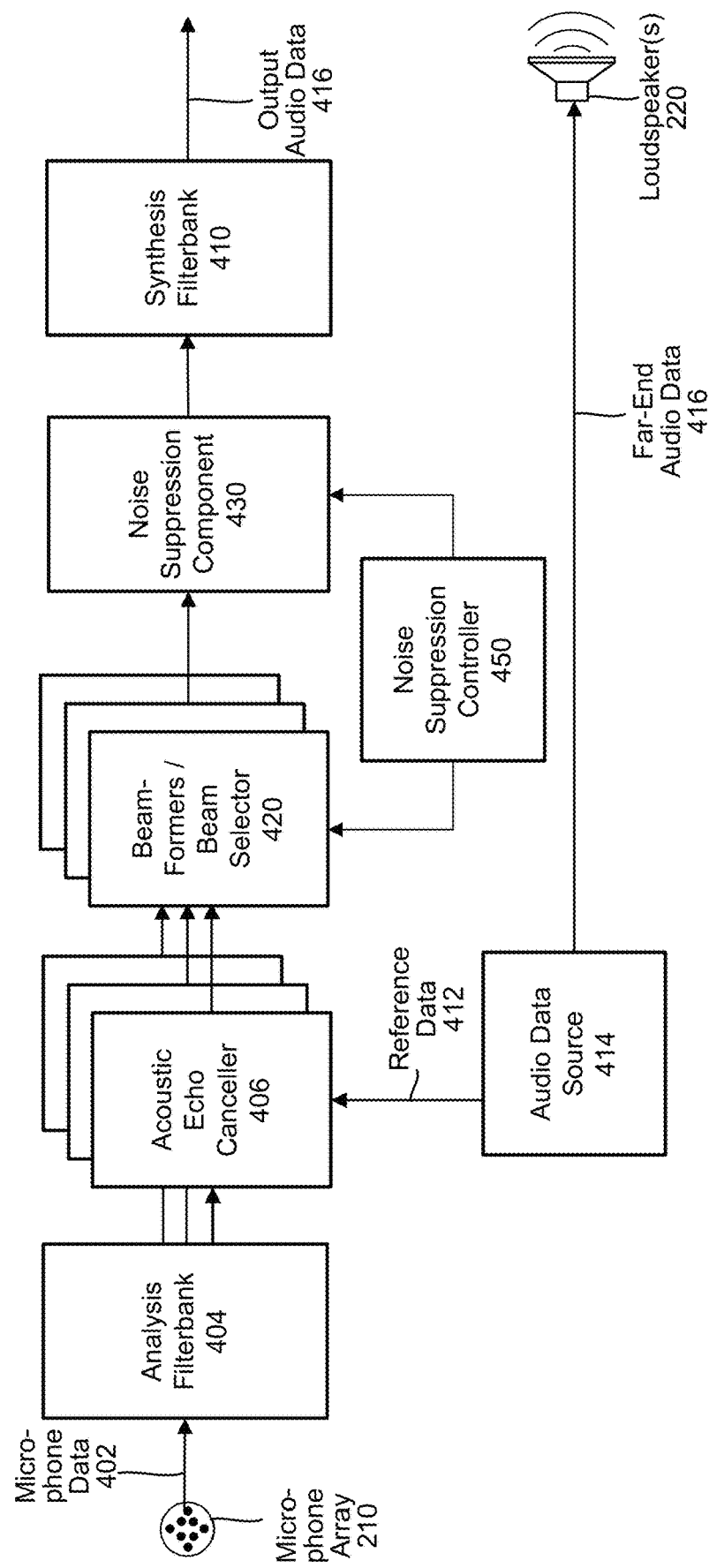

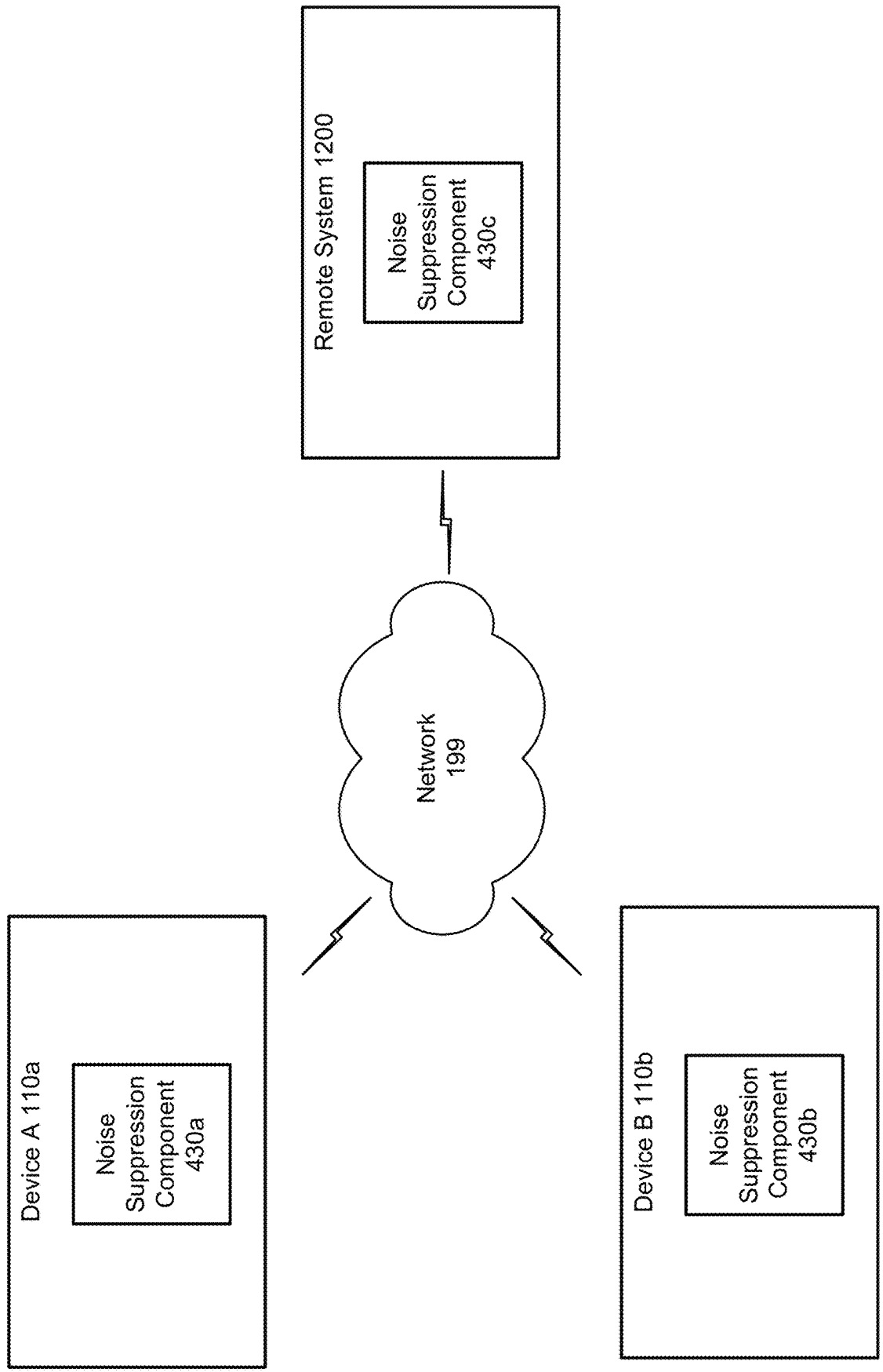

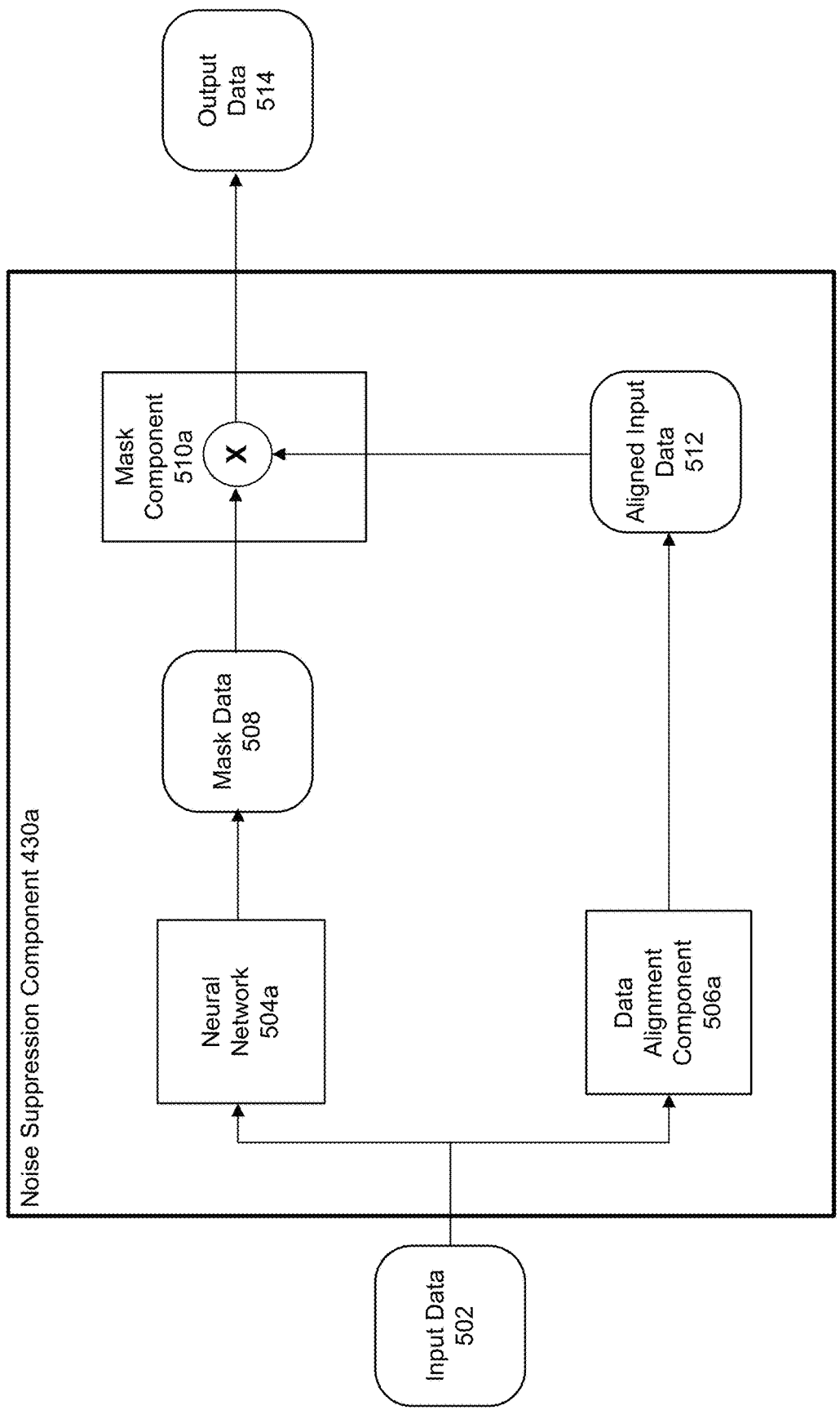

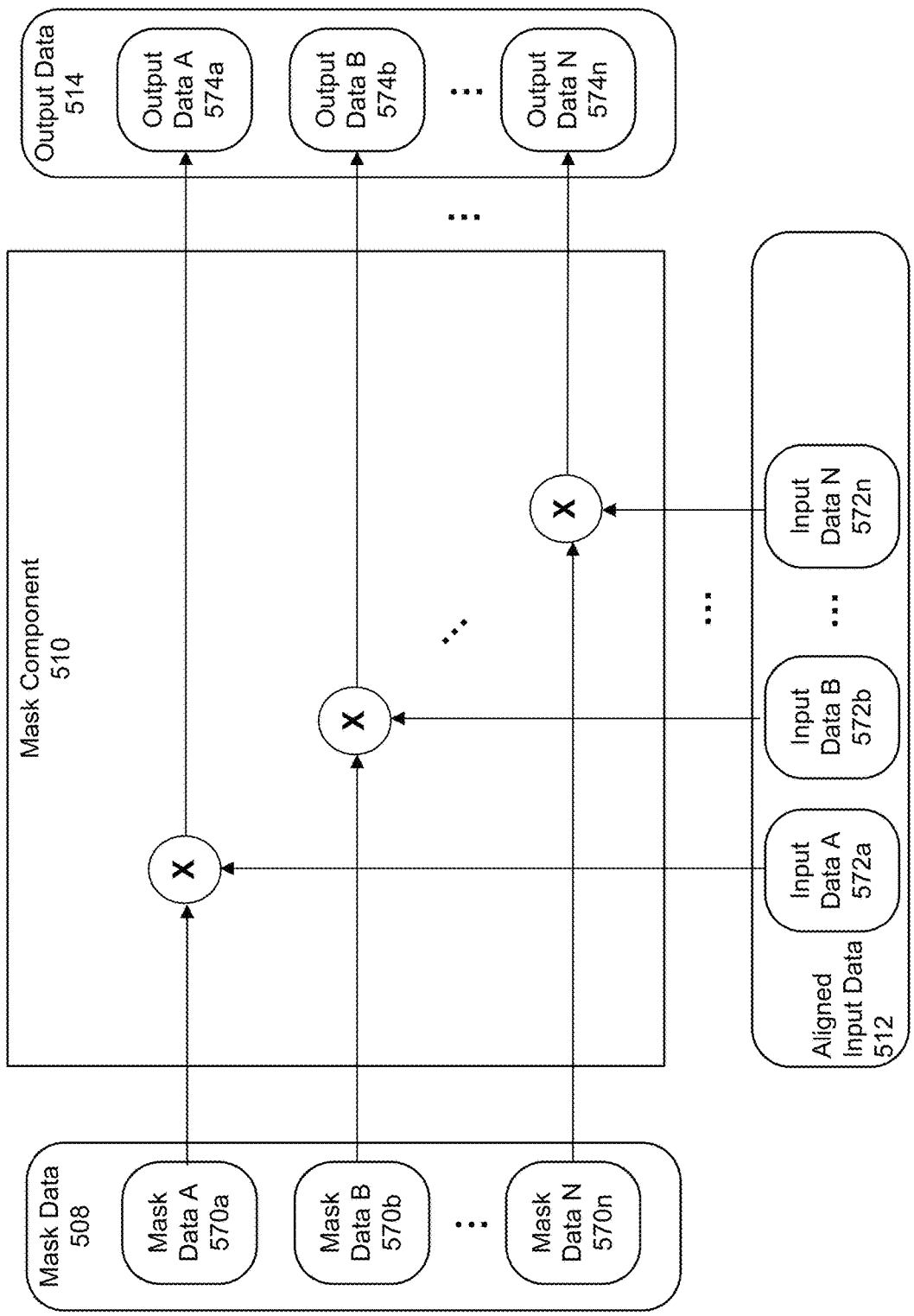

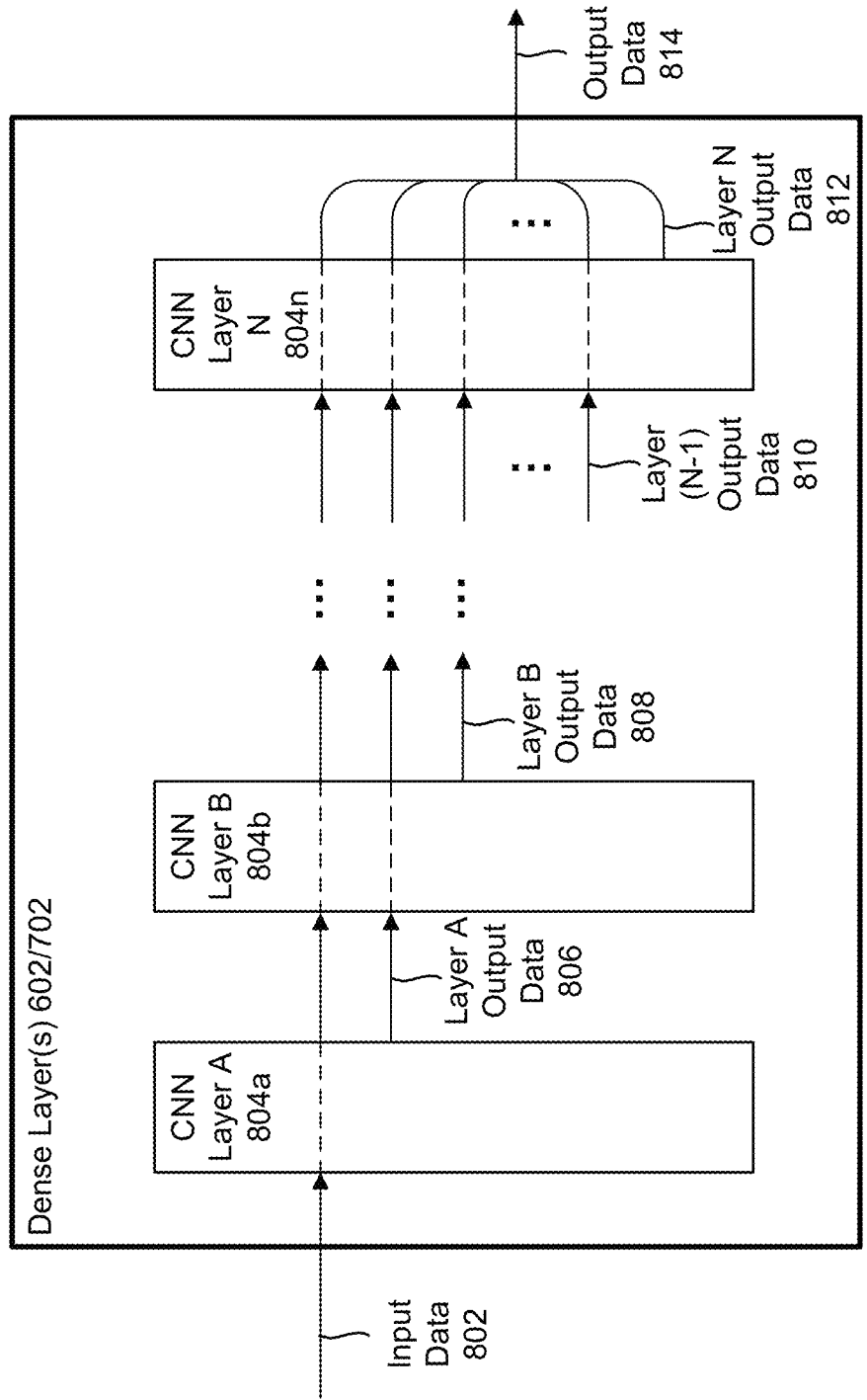

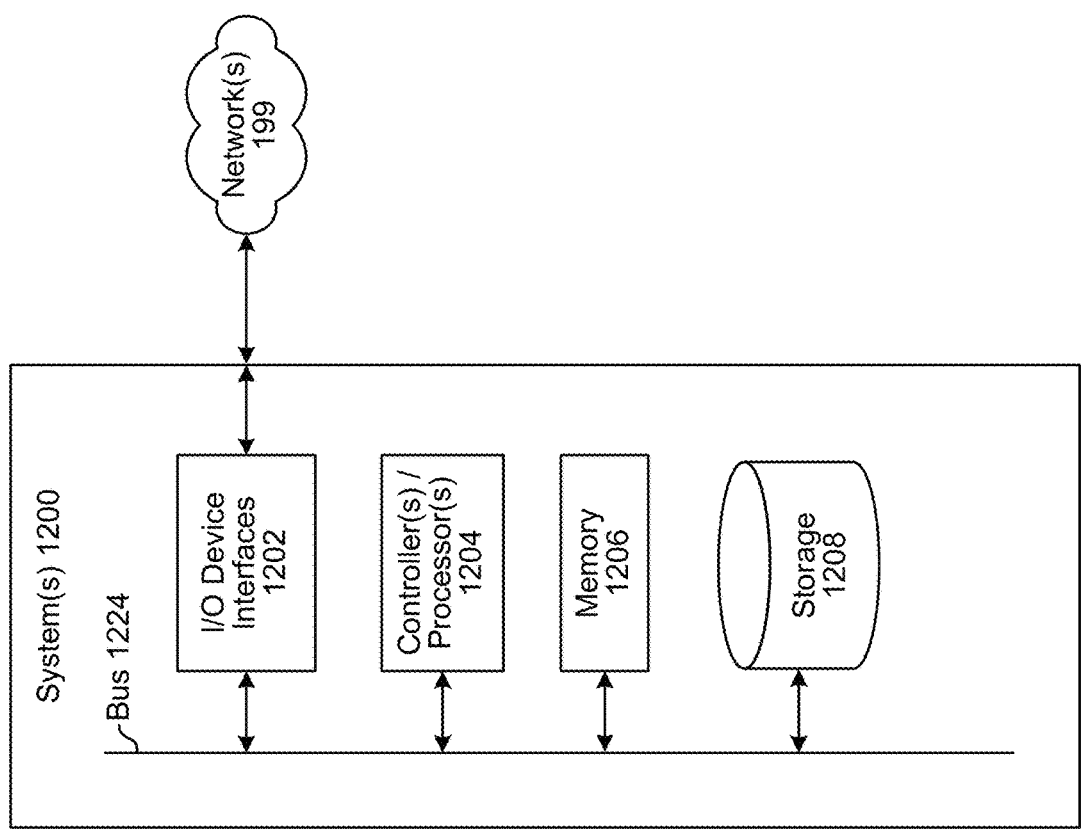

AUTONOMOUSLY MOTILE DEVICE WITH NOISE SUPPRESSION

BACKGROUND

A computing device may be an autonomously motile device and may include at least one microphone for capturing audio, which may include a representation of an utterance, in an environment of the computing device. Techniques may be used to process audio data received from the microphone to suppress noise also represented in the audio data. The device may cause further processing to be performed on the processed audio data.

BRIEF DESCRIPTION OF DRAWINGS

For a more complete understanding of the present disclosure, reference is now made to the following description taken in conjunction with the accompanying drawings.

FIG. 1 illustrates a system and method for noise suppression according to embodiments of the present disclosure.

FIGS. 2A, 2B, 2C, and 2D illustrate views of an autonomously motile device according to embodiments of the present disclosure.

FIGS. 4A and 4B illustrate components for audio processing using an autonomously motile device according to embodiments of the present disclosure.

FIGS. 5A, 5B, 5C, and 5D illustrate noise-suppression components of an autonomously motile device according to embodiments of the present disclosure.

FIGS. 8A-8C illustrate dense layers of an autonomously motile device according to embodiments of the present disclosure.

FIG. 12 illustrates a block diagram of a server according to embodiments of the present disclosure.

DETAILED DESCRIPTION

Figure 2A:
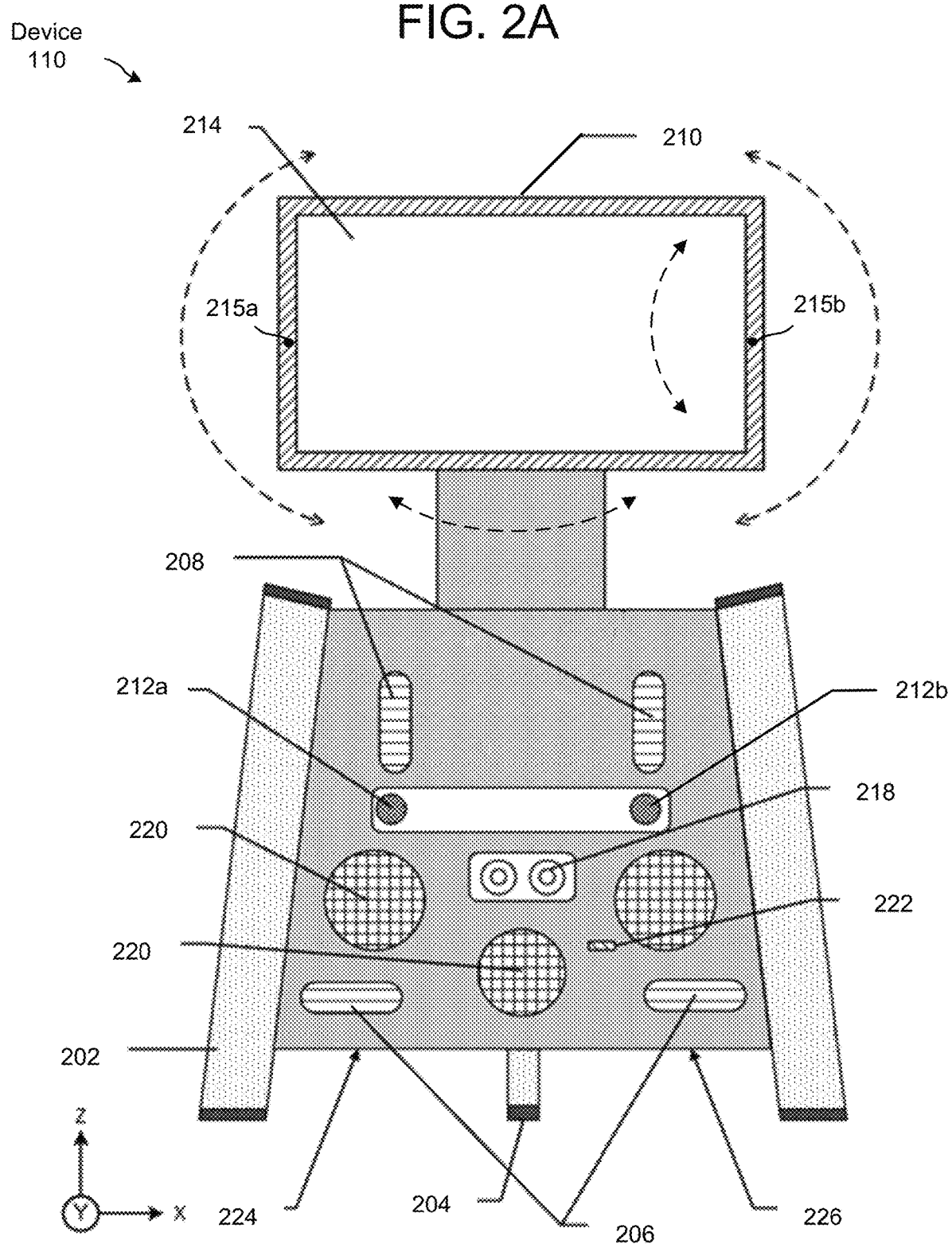

A device such as an autonomously motile device—e.g., a robot—may be a device capable of movement of itself, and/or of components of itself, within an environment. The device may include, among other components, one or more microphones that are capable of sensing audio present in the environment and transforming that audio into audio data. The autonomously motile device may process the audio data, as described herein, and then cause further processing to be performed on the processed audio data. This further processing may include performing automatic speech recognition and/or natural language understanding processing and/or causing the processed audio data to be output by a second device as part of, for example, audio and/or video communication. Alternatively, the further processing may include other operations such as acoustic event detection where audio data is used to determine if a certain event has occurred (such as a garage door opening, door closing, etc.).

The device may also perform beamforming. In audio systems, beamforming refers to techniques that are used to isolate audio from one or more particular directions. Beamforming may be used to filter noise from a noise source disposed in a direction different from that of an intended audio source. A fixed beamformer component may isolate audio from particular directions by applying one or more filters, each having different filter coefficients, to exploit variations in the time each microphone in a microphone array receives audio from each direction. An adaptive beamformer may remove noise by identifying a direction in which a noise source lies and removing that noise from desired audio. A beam-selection component may select at least one beam from a plurality of beams corresponding to a desired direction, such as a direction toward which a user is disposed.

Identification of a direction corresponding to a source of noise may, however, be difficult when the device is moving relative to the source of noise, when the source of noise is moving relative to the device, or both. This relative motion may cause the source of noise to move from a first beam associated with a first direction relative to the device to a second beam associated with a second direction relative to the device. If the device does not detect this relative motion (or does not detect it within a certain period of time), the device may cause removal of audio data corresponding from the first beam instead of removal of audio data corresponding to the second beam. This lack of detection or delayed detection may cause the device to fail to remove some or all of the noise from the audio data and/or cause the device to remove desired audio, such as a representation of speech, from the audio data.

In various embodiments of the present disclosure, a noise-suppression component, which may include a trained model such as a neural network, processes audio data received from at least one microphone and suppresses noise in the audio data to generate processed audio data that represents an utterance or other desired audio (for example specific audio generated by another device) but that does not include the noise. The utterance may be or include speech and/or non-speech sounds, such as grunts or whistles. A filter, such as an analysis filterbank, may process the audio data to determine frequency data corresponding to at least one frequency of the audio data. The frequency data may be or include a spectrogram; one dimension of the spectrogram may be frames of audio data, and another dimension of the spectrogram may be frequency bins. The filter may further divide the spectrogram data into real spectrogram data (which includes the real portion of the spectrogram data) and imaginary spectrogram data (which includes the imaginary portion of the spectrogram data). The filter may similarly divide the spectrogram data into magnitude spectrogram data and phase spectrogram data.

The neural network may include an encoder that processes the audio data to determine one or more high-level features of the audio data, such as volume, tone, pitch, and/or speech rate, or other features as represented by first feature data. The neural network may further include one or more recurrent layers, such as gated recurrent unit (GRU) layers and/or long short-term memory (LSTM) layers, that process the first feature data (along with previously received first feature data) to determine second feature data. The second feature data may correspond to a number of items of first feature data received over a period of time, such as 5-10 seconds or, in some embodiments, 6-8 seconds. This period of time may correspond to the duration of time of an estimated/average utterance. The estimated duration of an utterance, such as an average utterance, may be determined through analysis of training data corresponding to different speech systems. Data related to the duration may be directly stored by the device and/or incorporated into components of the noise-suppression component and/or noise suppression controller. For example an encoder may be configured to encode audio data corresponding to a window of an average utterance duration for purposes of processing by downstream components such as an encoder. The neural network may further include a decoder for processing the second feature data to determine output data representing an utterance and suppressed noise.

Although the disclosure herein references an autonomously motile device, the present disclosure is not limited thereto, and embodiments of the present disclosure include non-motile (e.g., stationary) devices. Examples of such devices include voice-controlled devices, such as smart speakers and Internet of Things devices, computers, laptops, and/or tablet computers. As mentioned above, such devices may experience relative motion with respect to a noise source if the noise source is moving. In addition, some devices may move with respect to their environment even if they are not autonomously motile if, for example, they are carried or otherwise moved by a human. Examples of such devices include cellular telephones.

FIG. 1 illustrates a system that includes an autonomously motile device 110, which is described in greater detail below. In various embodiments, the autonomously motile device 110 is capable of autonomous motion using one or motors powering one or more wheels, treads, robotic limbs, or similar actuators. The autonomously motile device 110 may further be capable of three-dimensional motion (e.g., flight) using one or more rotors, wings, jets, electromagnetic field generators, or similar actuators. The motion may be linear motion and/or angular motion. The present disclosure is not limited to particular method of autonomous movement/motion. The device 110 may, for example, follow a user 102 in an environment to thereby allow the user 102 easier access to features of the device 110, such as its voice interface. For example, the user 102 may utter a command, represented by an utterance 104, that is received by the device 110. The device 110 may further move in the environment in response to input from the user 102, which may be in the form of an utterance (e.g., "Follow me" or "Go to the kitchen") and/or input from a second user device, such as a tablet computer. The device 110 may further move in the environment in accordance with predetermined instructions, such as moving to different rooms of the environment at a determined time and capturing image data (e.g., a "sentry" mode).

As explained herein, the environment may include one or more noise sources 106, which may produce noise 108. Example noise sources 106 include heating/cooling systems, sounds from a pet, whirring of an electric fan, sound output from a stereo or television, automobile traffic sounds, or other such sounds. Noise 108 may also be produced by device 110, such as through the operation of mechanical components of device 110. The noise source 106 may be or include the device 110 itself; a motor, wheel, mast, and/or other component of the device 110 may produce noise 108. This noise may be transmitted through the environment to a loudspeaker of the device 110 and/or through the device itself. The noise 110 may further be or include sound output by the loudspeaker of the device; for example, acoustic echo cancellation may perform less well while the device 110 is in motion (cancelling, for example, 20 dB of echo while in motion while cancelling 30 dB of echo while at rest), and this reduction in echo cancellation may be or include the noise 108. The device 110 may capture audio that represents both desired audio, such as the utterance 104, and the noise 108. Presence of the noise in the captured audio may deleteriously affect the operation of other functions of the device 110 or other system, such as wakeword detection, automatic speech recognition, or audio/video communications.

Figure 10:
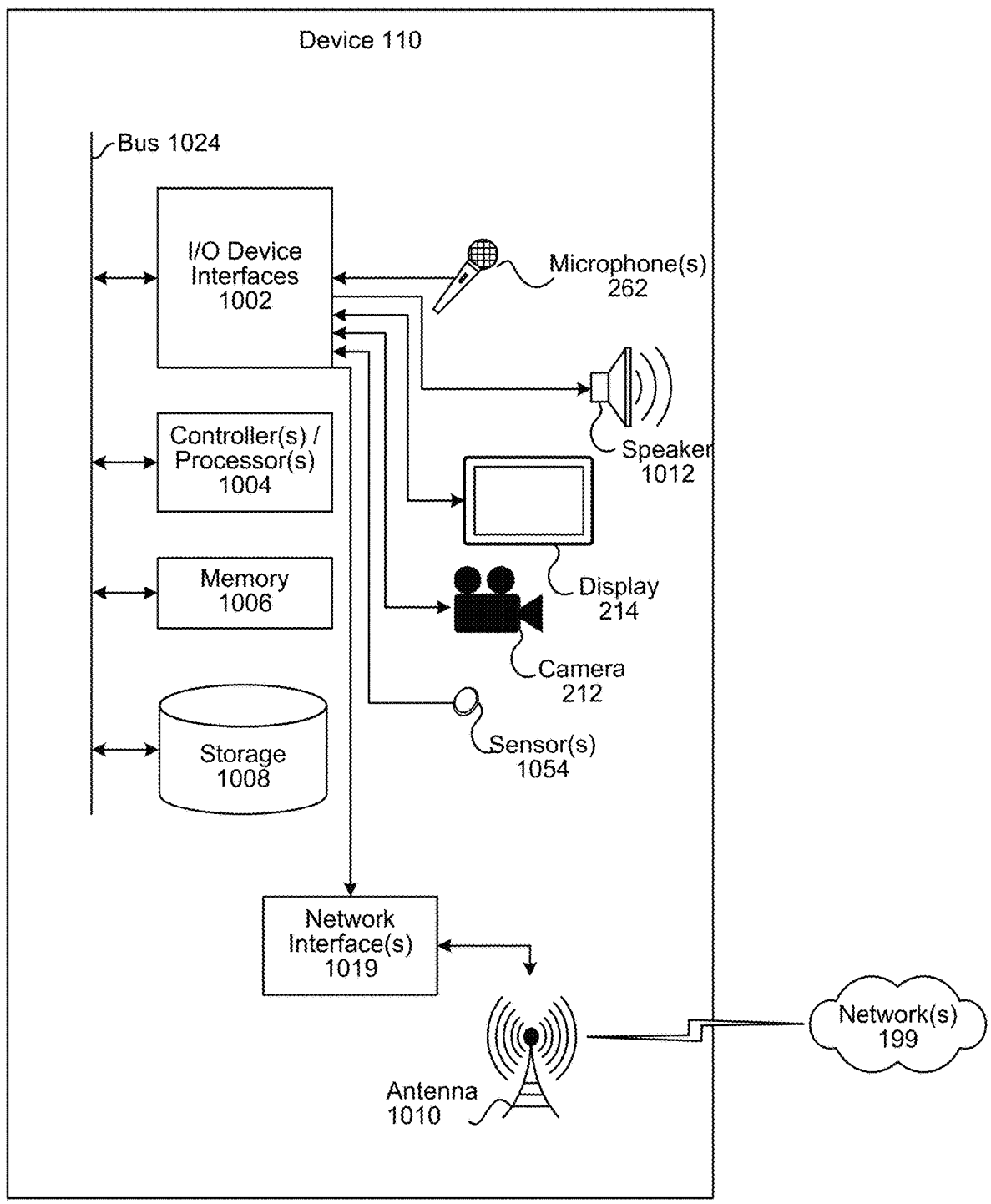
FIG. 10 illustrates a block diagram of an autonomously motile device according to embodiments of the present disclosure.

The device 110 may contain a number of other systems or components, as described in greater detail herein. For example, the device 110 may include one or more display screens for displaying information to a user 102 and/or receiving touch input from a user. The device 110 may include a loudspeaker to output audio to the user 102, such as audio related to a command or audio related to a request. The device 110 may further include one or more sensors, as explained in greater detail below with respect to FIG. 11C. These sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces, as shown in FIG. 10. In some embodiments, the device 110 is capable of rotation but not linear motion; the device 110 may be mounted or placed on a surface or floor, for example, and may rotate in place to face a user 102. The disclosure is not, however, limited to only these systems or components, and the device 110 may include additional components without departing from the disclosure.

In various embodiments, with reference to FIG. 1, the autonomously motile device 110 receives (121), from at least one microphone, first audio data that includes representations of both an utterance 104 of a user 102 and noise 108 from a noise source 106. The microphone may be or include, for example, a piezoelectric component or membrane that senses vibrations in the air proximate the microphone and transduces those vibrations into a corresponding electric signal. The device 110 may further include circuitry to process the signal transduced by the microphone, such as an amplifier and/or analog-to-digital converter.

As described herein, the device 110 may further process (122) the audio data to, for example, convert time-domain audio data into frequency-domain audio data (via, for example, a Fourier transform), divide the frequency-domain audio data into two or more frequency bins, divide the audio data into segments of time or "frames" of audio data, and/or process frequency-domain audio data to determine data corresponding to a real portion of the frequency-domain audio data (which may be real spectrogram data) representing the real portion of an audio signal and to determine data corresponding to an imaginary portion of the frequency-domain audio data (which may be imaginary spectrogram data) representing the imaginary portion of an audio signal.

The device 110 (and/or other system) may determine (124), using the first data and a first component comprising a first convolutional neural network (CNN) layer, first mask data corresponding to at least a first frequency of the noise. As explained in greater detail below, the first component may be or include a neural network, which may be or include an encoder, decoder, and/or recurrent layer(s). The mask data may be a vector of numbers; certain numbers of the vector may correspond to frequencies associated with the utterance, while other numbers of the vector may correspond to frequencies associated with the noise. The dimension of the mask vector (e.g., the size of the vector) may correspond to the dimension of the first data. For example, the first data may include a number of frequency bins, such as 128 bins, and each bin may include a number of different frequencies (e.g., 1024 frequencies) that lie in the frequency range determined by the bin. The dimension of the mask data may thus be 128×1024 in this example. The mask data may further include a dimension corresponding to a number of frames of first audio data and, in particular, a number of frames of a frequency spectrogram corresponding to the first audio data. As explained in greater detail below, the numbers of the mask data may be zeroes and ones (a "binary mask"); zeroes for frequencies corresponding to the noise and ones for frequencies corresponding to the utterance. The mask data may, however, include numbers of any value. For example, the mask data may contain floating point numbers between zero and one (a "ratio mask").

The neural network may include a first component configured as a neural-network encoder, a second component that includes at least one recurrent neural network (RNN) cell, and a third component configured as a neural-network decoder. This configuration of encoder and decoder may be referred to as a sequence-to-sequence or "seq2seq" architecture. The encoder may be used to process frames of audio data to extract high-level features corresponding to one or more frames; these high-level features may represent, for example, the tone, pitch, speech rate, inflection, and/or accent of words represented in the audio data. The second component may be used to store or "remember" a number of seconds of previously received audio data, such as 5-10 or 6-8 seconds of audio data, which may represent an average duration of time of an utterance. The decoder may be used to process one or more outputs of the second component to determine the mask data.

Figure 6A:
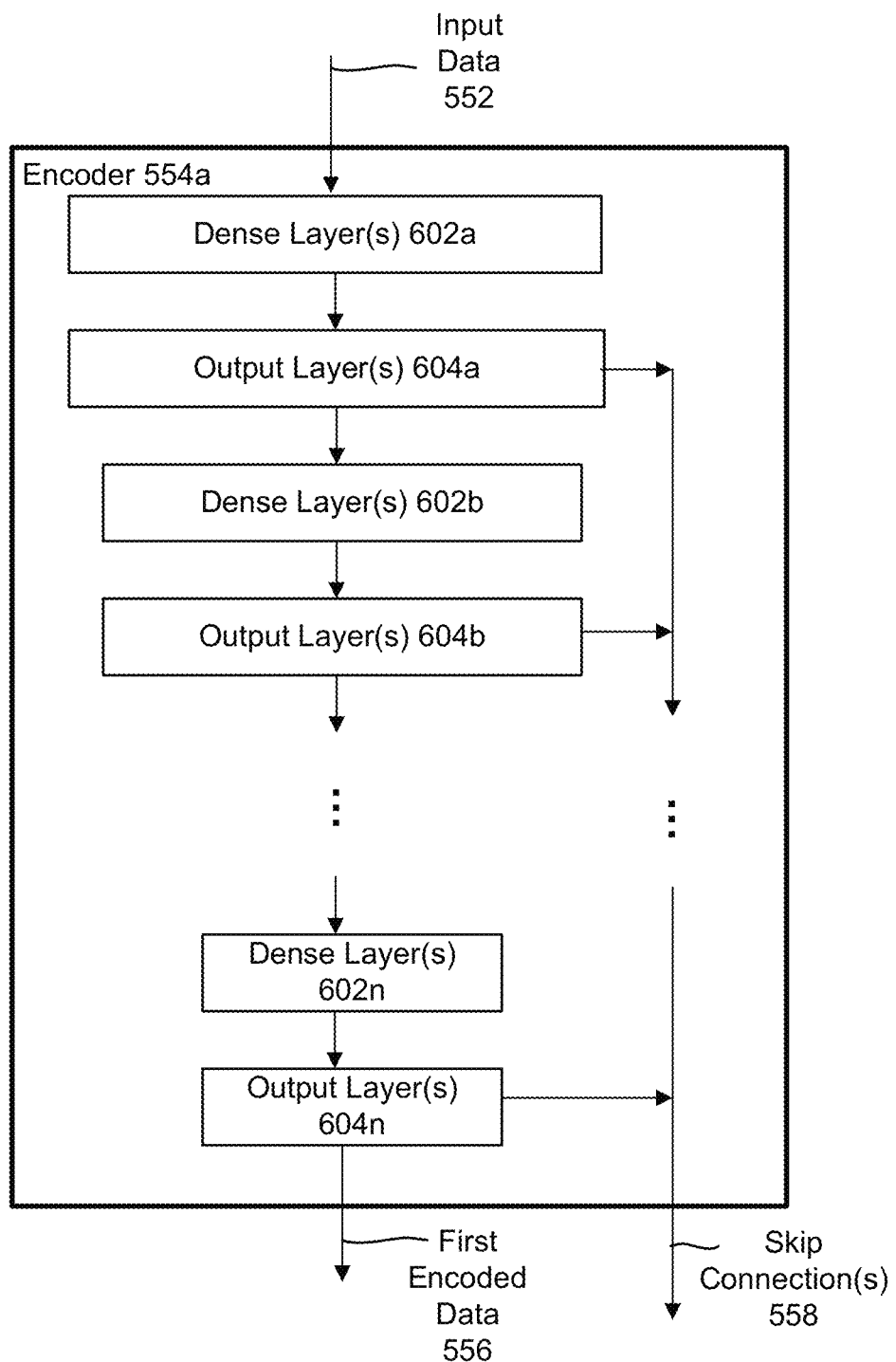
FIGS. 6A and 6B illustrate encoders of an autonomously motile device according to embodiments of the present disclosure.
Figure 6B:
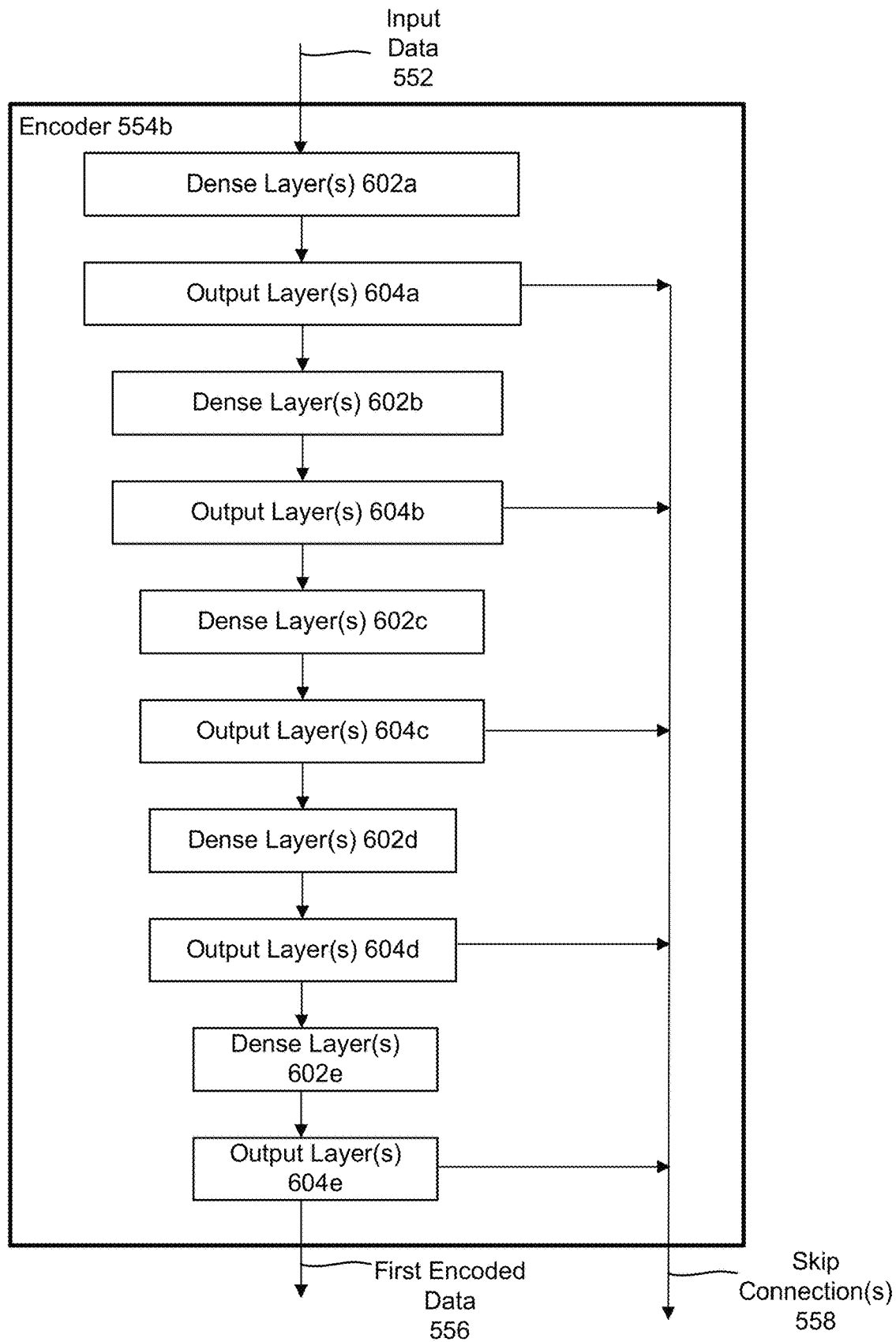

The encoder may include at least a convolutional neural network (CNN) layer that performs at least one convolution operation on the frequency-domain audio data. Examples of encoders are shown in FIGS. 6A and 6B. The convolution operation may be a function that processes a number of subsets of each item of frequency-domain audio data (e.g., each frame of data) in accordance with a function, such as a kernel function. For example, the kernel function may be an N×N matrix that selects a number of adjacent items of frequency-domain audio data and applies an operation, such as a sum or average operation, to the selected items. Subsequent numbers of adjacent items may be selected in accordance with a step size, in which the N×N matrix moves through the frequency-domain audio data by the step size.

The encoder and/or decoder may be "causal" networks, in which an output may be produced for each item of input as the input is received. A causal network may also be described as a real-time network. By contrast, a non-causal network may produce an output only after a certain number of inputs have been received; until the certain number of inputs are received, the non-causal network may not produce an output. For example, a non-causal network configured for natural-language understanding may receive text input such as "What is the weather forecast for tomorrow?" This non-causal network may produce an output, such as "Sunny," only when the last word of the text input ("tomorrow") is received and may not produce an output after other items of input ("what," "is," etc.) are received. A non-causal network may include one or more bi-directional layers that process the input data both from beginning to end and from end to beginning. A causal network, such as the encoder or decoder described herein, may not include bi-directional layers. In various embodiments, the encoder and/or decoder includes CNN layers and other feedforward layers, such as pooling layers and/or fully-connected layers.

The neural network may process, using the RNN layer(s) having at least one value, the first encoded data to determine second encoded data corresponding to the first encoded data and the at least one value. The RNN layer(s) may include one or more cells that receive an input that includes a portion of an output of that same cell and/or an output of a cell in a subsequent layer. The RNN layer(s) thus include at least one connection between cells defining a feedback loop, thus permitting the RNN layer(s) to retain information received from previously received input data. The RNN layer(s) may include, for example, one or more long short-term memory (LSTM) cells, one or more gated recurrent unit (GRU) cells, or any other type of recurrent cell. An example of an LSTM cell appears in FIG. 9. In various embodiments, the RNN layer(s) is/are configured to retain information corresponding to 5-10 or 6-8 seconds of previously received audio data, which may correspond to the average duration of time of an utterance. The neural network may process, using at least a second CNN layer, the second encoded data to determine the mask data. The third component may be a decoder, such as the decoders illustrated in FIGS. 7A and 7B. Like the encoder, the decoder may be a causal network that produces an output for each item of input data (e.g., the second encoded data) received.

The device 110 (and/or other system) may then determine (126), using the first mask data and the first data, second data. A mask component may, for example, multiply the first data by the mask data to determine second data; the second data may include a representation of the utterance and a representation of suppressed noise. The mask component include a multiplier that may multiply each value of the first data by a corresponding value of the mask data. For example, the value for frequency 562 in bin 64 may be multiplied by the mask value at position 562 in bin 64. As also described in greater detail below, if the first data is divided into real and imaginary data, the mask component may include a first multiplier to multiply real mask data by the real data and imaginary mask data by the imaginary data.

The device 110 (and/or other system) may then process (128) the second data to determine second audio data representing the utterance (and a suppressed version of the noise). This second audio data may then be used by other systems, such as a speech-processing system (for, e.g., ASR/NLU), a communications system, or other system.

As explained in greater detail below, the noise-suppression component may be trained to process received audio data that includes a representation of both an utterance and of noise and generate mask data for determining a representation of the utterance and suppressed noise. As the term is used herein, noise suppression refers to reducing a magnitude of the volume of the representation of the noise represented in the audio data. This reduction in magnitude includes reducing the magnitude to zero. Training may include processing, using the noise-suppression component, items of input training data and then modifying the noise-suppression component to produce desired target outputs.

The input training data may include, for example, audio data that includes a representation of an utterance and noise, and the target output may include, for example, audio data that includes a representation of the utterance but not the noise. The training data may be generated by, for example, generating audio data that includes only the utterance and then adding a representation of the noise to a copy of that audio data. The training data may include many examples of inputs and targets; the different examples may include, for example, different utterances, different speakers, different noise sources, and/or different environments. For example, the training data may include noise originating from an external noise source and/or noise originating from the device 110 (such as noise caused by mechanical components of the device). The training data may also include audio samples taken from the device 110 while stationary and/or audio samples taken from the device 110 while in motion. The input training data may further include audio data that includes a representation of the noise but not a representation of the utterance. The present disclosure is not limited to any particular type or number of items of training data.

The noise-suppression component may be configured during training to produce desired target data (e.g. output training data) given a corresponding item of input training data by, for example, evaluating its actual output against the target output. This evaluation may be performed by a comparison function, such as a loss function. As explained in greater detail below, a first loss function may be used when evaluating the output of the noise-suppression component against corresponding target output when the input training data includes a representation of both the utterance and noise, and a second loss function may be used when evaluating the output of the noise-suppression component against corresponding target output when the input training data includes a representation of only the noise.

If the actual output of the noise-suppression component differs from that of the target output, the noise-suppression component may be re-configured to produce a different output. For example, the CNN and/or LSTM layers may be associated with different configuration values, such as a weight value and/or offset value, that may be re-configured. One or more new values may be determined using a re-configuration algorithm, such as a gradient descent algorithm. The training process may be repeated (e.g., the loss function(s) may be recomputed and the gradient descent algorithm re-run) until a desired accuracy is achieved (e.g., the output of the loss function is less than a desired threshold).

FIGS. 2A, 2B, 2C, and 2D illustrate views of an autonomously motile device configured for noise suppression according to embodiments of the present disclosure. FIG. 2A illustrates a front view of the autonomously motile device 110 according to various embodiments of the present disclosure. The device 110 includes wheels 202 that are disposed on left and right sides of the device 110. The wheels 202 may be canted inwards toward an upper structure of the device 110. In other embodiments, however, the wheels 202 may be mounted vertically (e.g., not canted) or canted away from the upper structure. A caster 204 (e.g., a smaller wheel) may disposed along a midline of the device 110. As mentioned above, the wheels and/or motors driving the wheels may create noise 108 that may be transmitted through the device 110 to a loudspeaker 220.

The front section of the device 110 may include a variety of external sensors. A first set of optical sensors 206, for example, may be disposed along the lower portion of the front of the device 110, and a second set of optical sensors 208 may be disposed along an upper portion of the front of the device 110. A microphone array 210 may be disposed on a top surface of the device 110; the microphone array 210 may, however, be disposed on any surface of the device 110.

One or more cameras 212 may be mounted to the front of the device 110; two cameras 212a and 212b, for example, may be used to provide for stereo vision. The distance between the two cameras 212 may be, for example, 5-15 centimeters; in some embodiments, the distance is 10 centimeters. In some embodiments, the cameras 212 may exhibit a relatively wide horizontal field-of-view 308. For example, the horizontal field-of-view 308 may be between 90° and 110°. A relatively wide field-of-view 308 may provide for easier detection of moving objects, such as users or pets, which may be in the path of the device 110. Also, the relatively wide field-of-view 308 may provide for the device 110 to more easily detect objects when rotating or turning.

Figure 2B:
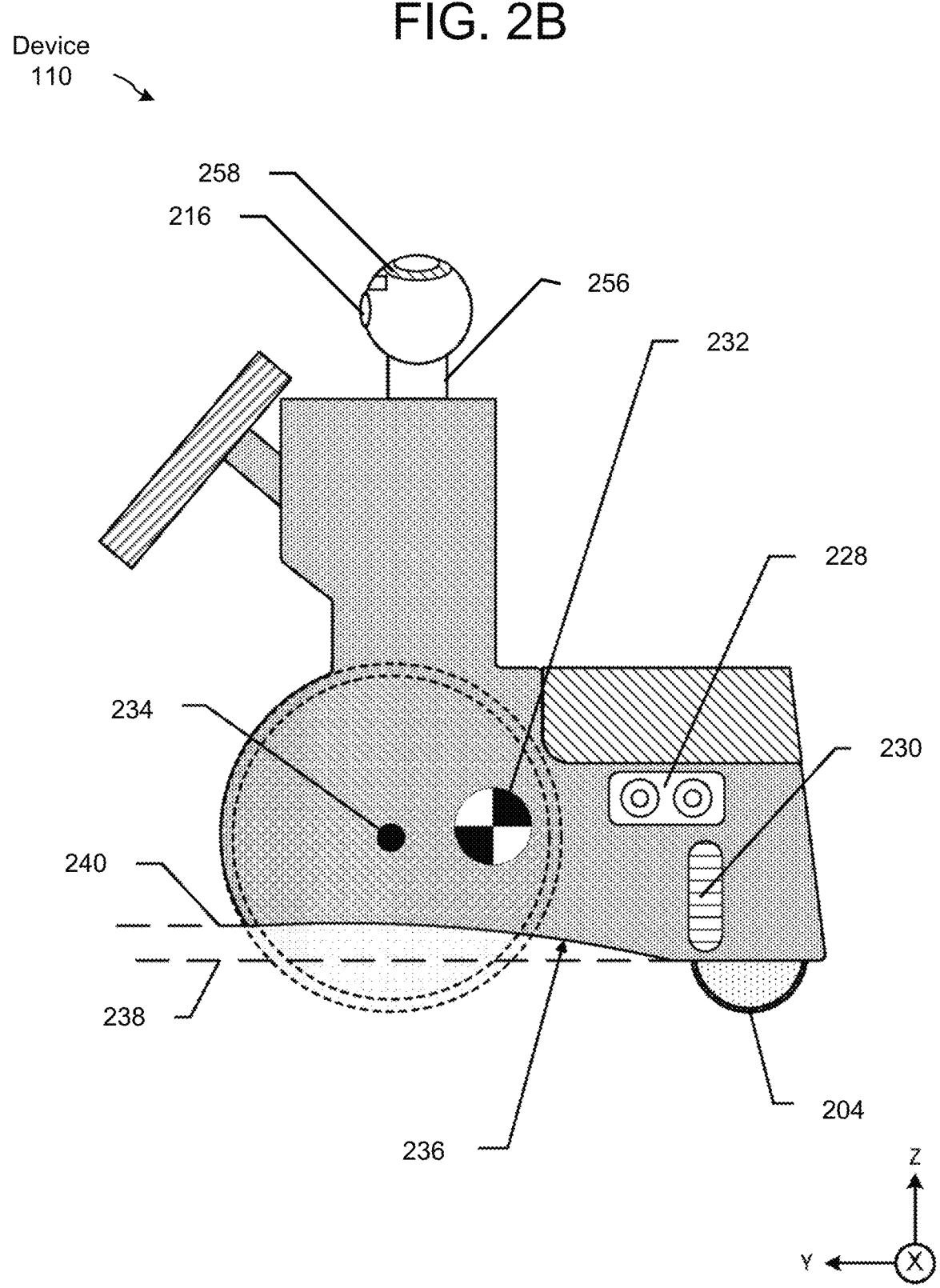

The cameras 212, which may be used for navigation as described herein, may be of different resolution from, or sensitive to different wavelengths than, other cameras used for other purposes, such as video communication. For example, the navigation cameras 212 may be sensitive to infrared light allowing the device 110 to operate in darkness or semi-darkness, while a camera 216 mounted on a mast 256 (as shown in FIGS. 2B and 2C) may be sensitive to visible light and may be used to generate images suitable for viewing by a person. A navigation camera 212 may have a resolution of at least 300 kilopixels each, while the camera 216 may have a resolution of at least 10 megapixels. In other implementations, navigation may utilize a single camera. The camera 216 that is mounted on the mast 256 that may extend vertically with respect to the device 110.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. As mentioned above, some or all of these movements may create noise 108 that may be transmitted through the device 110 to a loudspeaker 220. In some embodiments, the display 214 may be approximately 20 centimeters as measured diagonally from one corner to another. An ultrasonic sensor 218 may be mounted on the front of the device 110 and may be used to provide sensor data that is indicative of objects in front of the device 110. Additional cameras 215a, 215b may be mounted on a housing of the display 214.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 204 is shown in a trailing configuration, in which the caster 204 is located behind or aft of the wheel axle 234 and the center of gravity 232. In another implementation (not shown) the caster 204 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258. The mast 256 may extend and retract vertically with respect to the device 110. The light 258 may activate (e.g., emit light) to indicate activity of the device 110, such as processing audio data in response to detection of a wakeword.

FIG. 2D illustrates further details of the microphone array 210. As explained herein, the device 110 may include only a single microphone, and the noise-suppression component 430 may receive audio data from, and suppress noise therein, from only that single microphone. In other embodiments, the device 110 includes more than one microphone, and the noise-suppression component 430 process audio data received from one of the more than one microphones. In still other embodiments, the device 110 receives audio data from more than one microphone; this audio data may be, for example, an average of audio data received from the more than one microphones.

In some embodiments, the microphone array 210 includes eight microphones 262*a*, 262*b*, 262*c*, 262*d*, 262*e*, 262*f*, 262*g*, and 262*h*, arranged in two concentric circles; the four microphones of one circle may be rotated 45 degrees with respect to the four microphones of the other circle. The present disclosure is not, however, limited to any particular number or arrangement of microphones.

The microphone array 210 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 3:
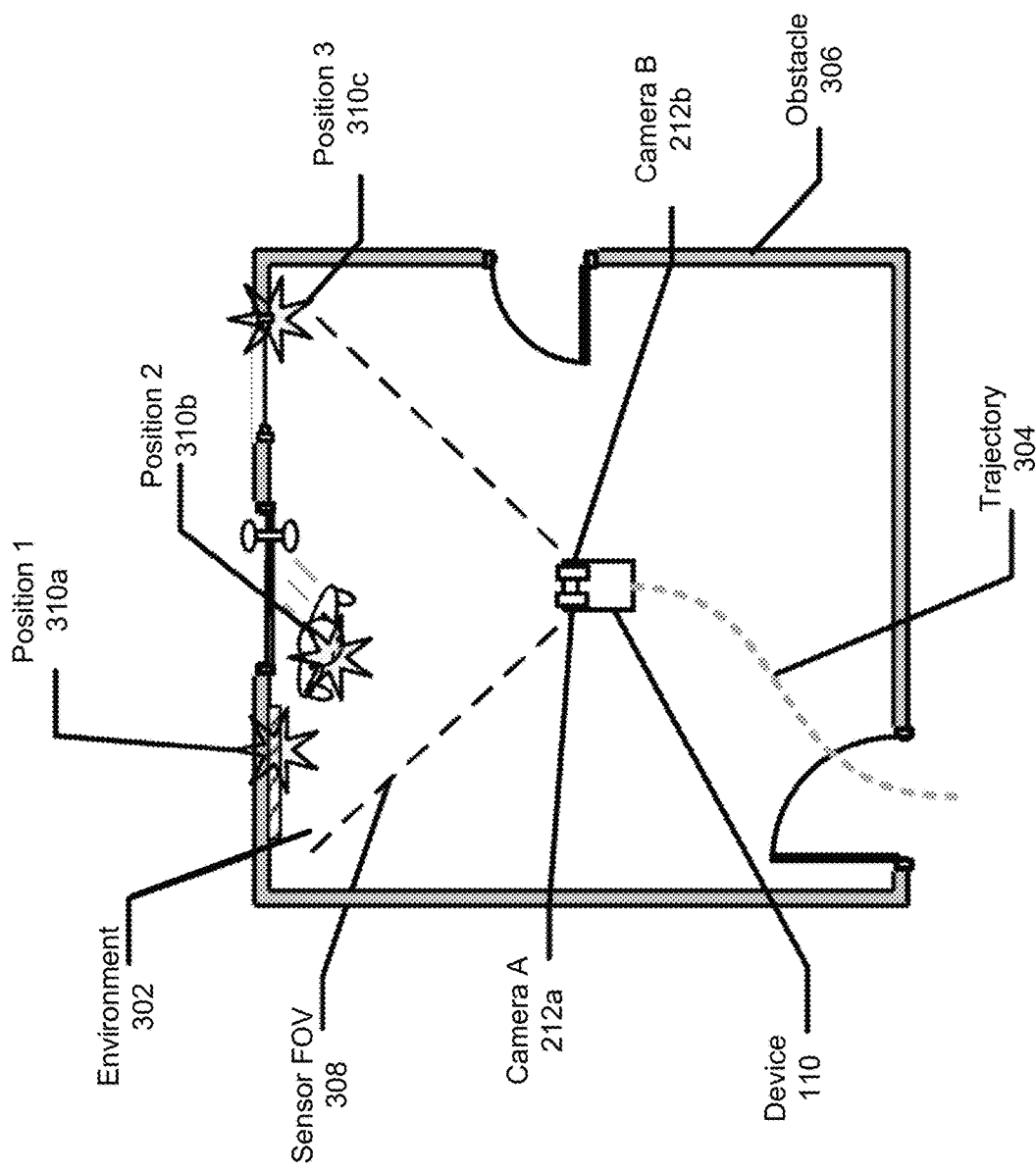
FIG. 3 illustrates an environment of an autonomously motile device according to embodiments of the present disclosure.

As shown in FIG. 3, the autonomously motile device 110 may move in the environment 302. The motion of the autonomously motile device 110 may be described as a trajectory 304. In some implementations, the trajectory 304 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 302 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 11A:
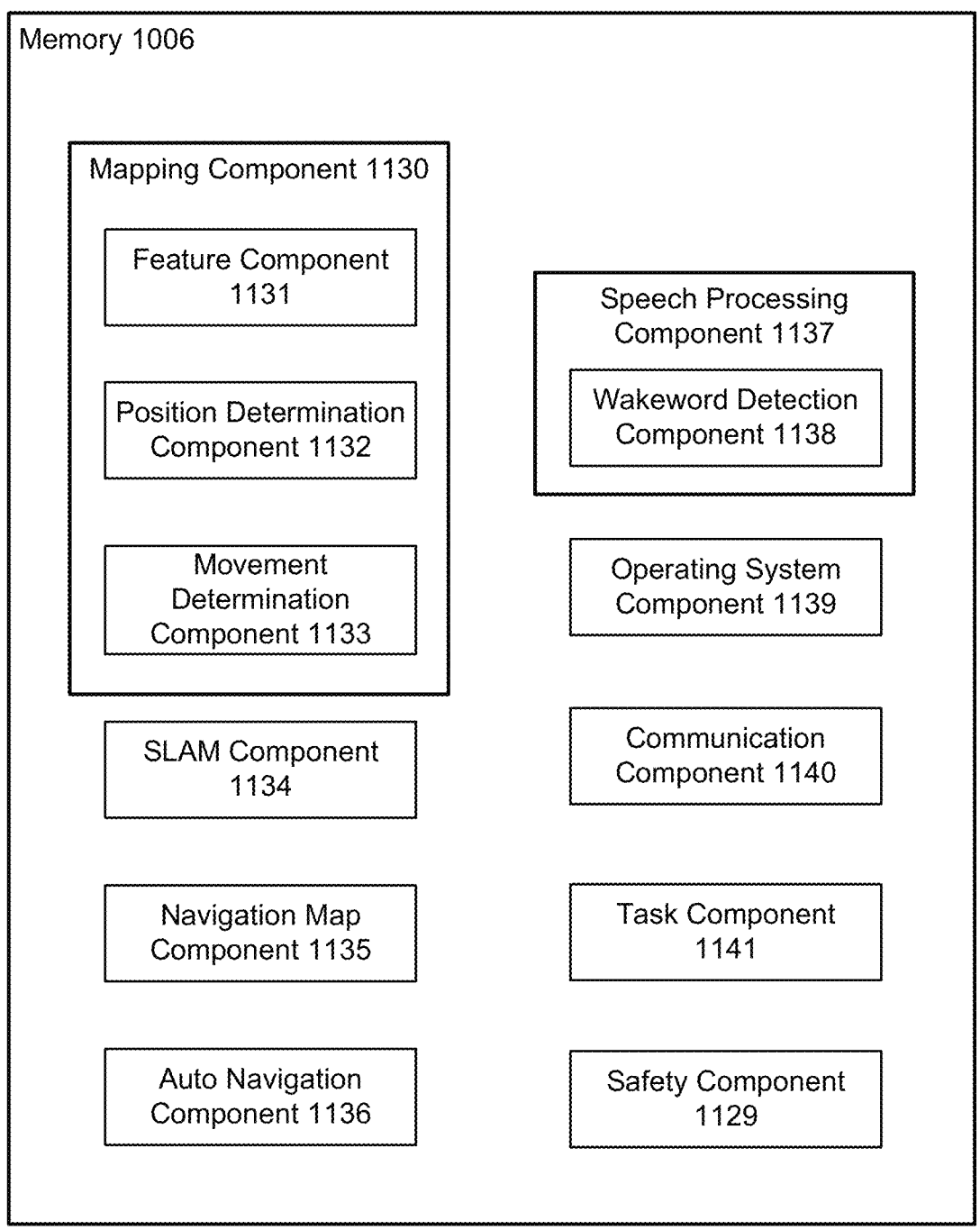
FIG. 11A illustrates components that may be stored in a memory of an autonomously motile device according to embodiments of the present disclosure.
Figure 11B:
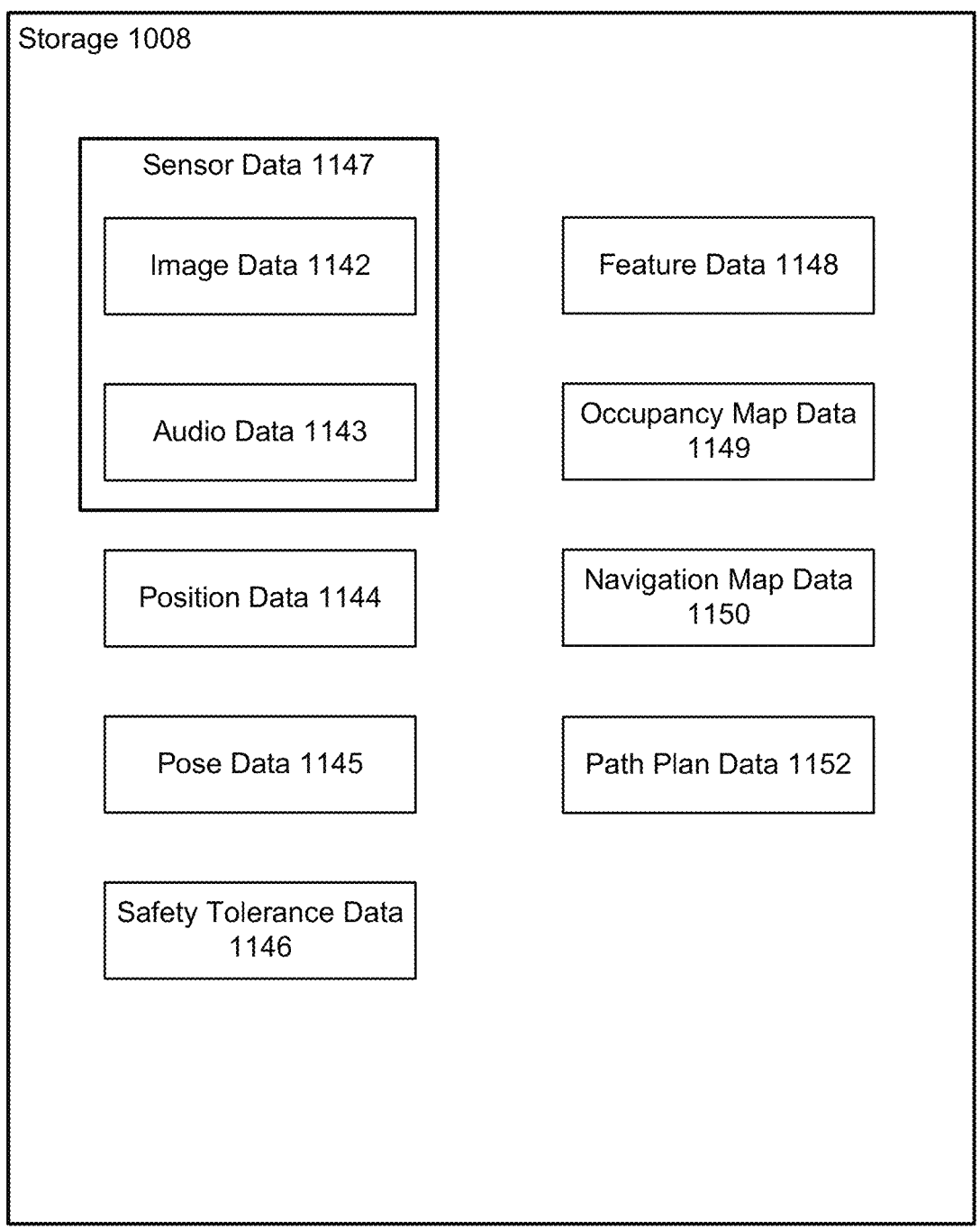
FIG. 11B illustrates data that may be stored in a memory of an autonomously motile device according to embodiments of the present disclosure.
Figure 11C:
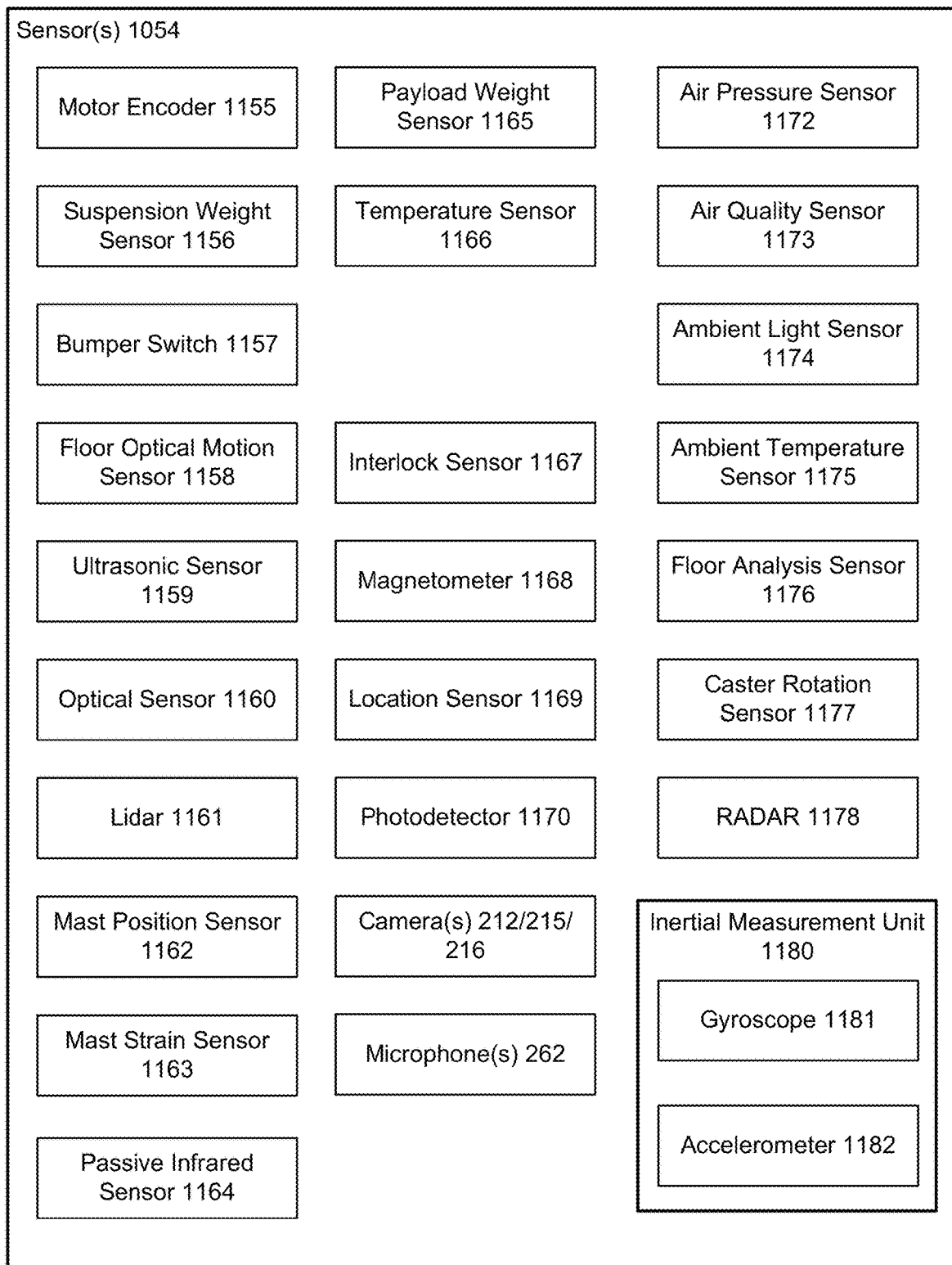
FIG. 11C illustrates sensors that may be included as part of an autonomously motile device according to embodiments of the present disclosure.

The autonomously motile device 110 may include one or more sensors 1054 (as shown in FIG. 11C). For example, the sensors 1054 may include a first camera 212*a*, a second camera 212*b*, an inertial measurement unit (IMU) 1180, microphones, time-of-flight sensors, and so forth. The first camera 212*a* and the second camera 212*b* may be mounted to a common rigid structure that maintains a relative distance between the cameras 212. An IMU 1180 may be attached to this common rigid structure, or one of the cameras affixed thereto. The first camera 212*a* and the second camera 212*b* may be arranged such that a sensor field-of-view 308 of the first camera 212*a* overlaps at least in part a sensor field-of-view 308 of the second camera 212*b*. The sensors 1054 may generate sensor data 1147 (which may be stored in storage 1008 as illustrated in FIG. 11B discussed below). The sensor data 1147 may include image data 1142 acquired by the first camera 212*a* and the second camera 212*b*. For example, a pair of images may comprise image data 1142 from the first camera 212*a* and the second camera 212*b* and may be acquired at the same time. For example, a first pair of images are acquired at time $t_1$ and a second pair of images are acquired at time $t_2$. The sensors 1054 are discussed in more detail with regard to FIG. 11C.

During its operation, the autonomously motile device 110 may determine input data. The input data may include or be based at least in part on sensor data 1147 from the sensors 1054 onboard the autonomously motile device 110. In one implementation, a speech processing component 1137 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

A mapping component 1130 (which may be included in memory 1006 as illustrated in FIG. 10 and as further discussed below) determines a representation of the environment 302 that includes the obstacles 306 and their location in the environment 302. During operation the mapping component 1130 uses the sensor data 1147 from various sensors 1054 to determine information such as where the autonomously motile device 110 is, how far the autonomously motile device 110 has moved, the presence of obstacles 306, where those obstacles 306 are, and so forth.

A feature component 1131 processes at least a portion of the image data 1142 to determine first feature data 1148. The first feature data 1148 is indicative of one or more features that are depicted in the image data 1142. For example, the features may be edges of doors, shadows on the wall, texture on the walls, portions of artwork in the environment 302, and so forth. The environment 302 may include display devices that are capable of changing the images they portray. For example, a television may be presented in the environment 302. The picture presented by the television may also have features.

Various techniques may be used to determine the presence of features in image data 1142. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features in the image data 1142. A feature that has been detected may have an associated descriptor that characterizes that feature. The descriptor may comprise a vector value in some implementations. For example, the descriptor may comprise data indicative of the feature with respect to 256 different dimensions.

The first feature data 1148 may comprise information such the descriptor for the feature, the images that the feature was detected in, location in the image data 1142 of the feature, and so forth. For example, the first feature data 1148 may indicate that in a first image the feature is centered at row 994, column 312 in the first image. These data and operations, along with those discussed below, may be used by the autonomously motile device 110, and/or other devices, to perform the operations described herein.

FIGS. 4A and 4B illustrates systems for audio processing that include a noise-suppression component 430 according to embodiments of the present disclosure. For clarity, single instances of each component of the system may be illustrated; one of skill in the art will understand, however, that the system may include multiple instances of each component in accordance with each microphone 262 of the microphone array 210, each frequency bin, and/or each item of reference data 412 (as described in greater detail below). In some embodiments, the system includes eight microphones 262 and 128 frequency bins. An overview of the system is first presented in the below paragraphs; each component is then described in greater detail.

In various embodiments, referring first to FIG. 4A, one or more microphone(s) 262 receives audio corresponding to the environment 302 of the device 110 and transduces the audio into microphone data 402. An analysis filterbank 404 converts the audio data 402 into frequency-domain audio data and may further separate the frequency-domain audio data into two or more frequency ranges or "bins." An acoustic-echo cancellation component 406 may be used to remove reference audio data 612 from the frequency-domain audio data; this reference audio data 612 may be received from an audio data source 414, such as a far-end participant on a voice or video call. The far-end audio data 416 may be output using a loudspeaker 220; the microphone data 402 may include at least a portion of a representation of the far-end audio data 416.

In various embodiments, the components of FIG. 4A may process the microphone data 402 in orders that differ from that illustrated in FIG. 4A; any order of the components is within the scope of the present invention. Further, in some embodiments, some or all of the components of FIG. 4A may be temporarily or permanently disabled during operation of the device 110. For example, the beamformer 420 may be disabled during audio communications with a second device 110b.

The analysis filterbank 404 may perform a Fourier transform, such as a fast Fourier transform (FFT), and may include one or more uniform discrete Fourier transform (DFT) filterbanks, which convert the time-domain audio data 402 into the frequency-domain audio data. The frequency-domain audio data may be a spectrogram, which may be a two-dimensional matrix of numbers in which one dimension of the matrix corresponds to the number of frequency bins (e.g., 128) and in which a second dimension of the matrix corresponds to a number of audio frames. The spectrogram data may be divided into magnitude spectrogram data and phase spectrogram data. An audio frame may refer to a portion of the microphone data 402 captured over a period of time (for example, 8-10 milliseconds). A value of a frequency for a particular frequency bin for a given frame may be the average frequency determined during that period of time. The frequency-domain audio data may further be processed to determine magnitude audio data representing a magnitude of a signal for a particular frequency bin and frame and phase audio data for a particular frequency bin and frame.

The frequency-domain audio data may include a plurality of audio signals Y in each of a plurality of sub-band domains. The audio signals Y may incorporate audio signals corresponding to multiple different microphones 262 as well as different sub-bands (i.e., frequency ranges) as well as different frame indices (i.e., time ranges). Thus, the microphone data 402 from the mth microphone 262 may be represented as $X_m(k,n)$, where k denotes the sub-band index, and n denotes the frame index. The combination of all audio signals for all m microphones 262 for a particular sub-band index frame index may be represented as X(k,n).

The acoustic-echo cancellation component 406 may subtract reference audio data 412 from the frequency-domain audio data using, for example, hardware and/or software configured to subtract data representing a first signal from data representing a second signal. The acoustic-echo cancellation component 406 may include an adaptive filter, such as a finite impulse-response (FIR) filter, that is configured to minimize an error signal between an output of the filter and the near-end audio. Multiple acoustic echo cancellers 406 may be used for each microphone 262 and/or for each frequency bin. Multiple acoustic echo cancellers 406 may further be used for multiple reference audio data 612, such as left-and-right stereo reference signals. As device 110 may be moving, the acoustic echo path may change rapidly which may impact the performance of the acoustic-echo cancellation component 406. For example the acoustic-echo cancellation component 406 may achieve 30 db cancellation while device 110 is stationary but 20 db cancellation while device 110 is moving, thus resulting in more residual echo, that sounds less like the original signal. Such residual echo may be considered noise which may be suppressed by beamformer/beam selector component 420/noise suppression component 430.

A beamformer/beam selector component 420 may process the output(s) of the acoustic-echo cancellation component 406 to determine one or more audio data beams each corresponding to a different direction relative to the device 110, as described in greater detail below. As also described herein, one beam may correspond to a first direction in which the user 102 is disposed, while a second beam may correspond to a second direction in which the noise source 106 is disposed. In various embodiments, the noise-suppression component 430 (and/or other noise-suppression component) may subtract audio data corresponding to the second beam from audio data corresponding to the first beam to thereby suppress noise from the first beam. Although illustrated as including the beamformer/beam selector component 420, the operations of FIG. 4 in certain configurations may not involve beamforming and/or beam selection, for example when data from only a single microphone may be used such as in a voice call or other operation.

The noise-suppression component 430 may include a neural network trained to generate mask data corresponding to a frequency of noise represented in the microphone data 402. This neural network, as described herein, may include one or more convolutional neural networks (CNNs) and one or more recurrent neural networks (RNNs). The neural network may be a causal model, meaning that it may process microphone data 402 as it is received from the microphone array 210 and produce corresponding outputs. The model may further include one or more dense layers and one or more skip connections. The noise-suppression component 430 is described in greater detail below with reference to FIGS. 5A-5D, 6A, 6B, 7A, 7B, and 8A-8C.

A synthesis filterbank 410 may be used to convert the frequency-domain data back to time-domain output audio data 416 using, for example, an inverse Fourier transform (such as an Inverse Fast Fourier Transform (IFFT). This conversion may include combining magnitude data and phase data. The output audio data 416 may then be used for further audio processing, such as speech processing.

In various embodiments, the beamformer/selector 420 is a fixed or adaptive beamformer/selector configured to determine directional audio data in accordance with values of a matrix, referred to herein as a covariance matrix. The beamformer/selector 420 boosts audio from a target direction while suppressing audio from other directions As described herein, beamforming (e.g., performing a direction-based separation of audio data) corresponds to generating a plurality of directional audio signals (e.g., beamformed audio data) corresponding to individual directions relative to the microphone array 210. A first beam may correspond to first beamformed audio data associated with a first direction (e.g., portions of the input audio signals corresponding to the first direction), a second beam may correspond to second beamformed audio data associated with a second direction (e.g., portions of the input audio signals corresponding to the second direction), and so on. As used herein, "beams" refer to the beamformed audio signals that are generated by the beamforming operation. Therefore, a first beam corresponds to first audio data associated with a first direction, whereas a first directional calculation corresponds to the first filter coefficient values used to generate the first beam.

For example, the beamforming operation may individually filter input audio signals generated by multiple microphones 262 in the microphone array 210 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on.

To perform the beamforming operation, the beamformer/selector 420 may apply directional calculations to the input audio signals. In some examples, the beamformer/selector 420 may perform the directional calculations by applying filters to the input audio signals using filter coefficient values associated with specific directions. For example, the beamformer/selector 420 may perform a first directional calculation by applying first filter coefficient values to the input audio signals to generate the first beamformed audio data and may perform a second directional calculation by applying second filter coefficient values to the input audio signals to generate the second beamformed audio data.

In one example of a beamformer system, a fixed beamformer employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer may further include an adaptive beamformer that may adaptively cancel noise from different directions, depending on audio conditions.

Beamforming may be performed by determining filter coefficient values (e.g., Finite Impulse Response (FIR) filter coefficient values) for each beam direction (e.g., look direction, direction of interest, etc.) based on a position of physical microphones in the microphone array 210. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The filter coefficient values used to perform the beamforming operations may be calculated offline (e.g., preconfigured ahead of time) and stored in the device 110. In various embodiments, a computer model of the device 110 may be constructed using, for example, computer-aided design (CAD) software. The model may then be analyzed using a finite-element model (FEM) application; based on the FEM analysis, the acoustic properties of each microphone 262 may be determined for each incident angle. These properties may then be used to determine the values of the above-referenced matrices.

The beamformer/selector 420 receives the two or more items of adapted beam data and, in accordance with the various techniques described herein, such as selecting a loudest beam, selects data corresponding to a selected beam. The beamformer/selector 420 may select one or more of the beams as output beams. For example, the beam selector 420 may determine one or more signal quality values (e.g., loudness, SNR, power value, signal-to-noise plus interference ratio (SINR), and/or other signal quality metrics known to one of skill in the art) associated with each of the adapted beam data and may select the adapted beam data having the highest signal quality metric as the selected beam. In various embodiments, the beamformer/selector 420 is capable of selecting a new beam every 100-200 milliseconds.

FIG. 4B illustrates a system that may include a first device 110a, a second device 110b, and/or a remote system 1200 (as shown in FIG. 12), each of which may include the noise-suppression component 430. For example, the first device 110a may include a first noise-suppression component 430a, as illustrated above with reference to FIG. 4A. Alternatively or in addition, the remote system 1200 may include a noise-suppression component 430c, which may be used to remove noise from audio data received from either of the first device 110a, second device 110b, and/or other device. The remote system 1200 may use the noise-suppression component 430c to remove noise in the received audio data prior to performing speech processing, such as ASR and/or NLU processing. The device 110 may therefore send audio data, such as the microphone data 402, to the remote system. After processing the microphone data 402 using the noise-suppression component 430c, the remote system 1200 may send, to the device 110, response data that includes a representation of a response to the utterance 104.

Alternatively or in addition, if the first device 110a and/or second device 110b are participating in communications that includes sending and receiving audio data via the remote system 1200, the remote system 1200 may use the noise-suppression component 430c to remove noise in audio data after receipt thereof from the first device 110a and/or second device 110b but before transmitting the processed audio data to the other of the first device 110a and/or second device 110b. In other embodiments, the second device 110b may use a noise-suppression component 430b to remove noise from audio data received from the first device 110a and/or remote system 1200. In another embodiment the remote system 1200 may receive audio data corresponding to a voice message or other asynchronous communication between devices. In such an embodiment the remote system 1200 may process the audio data using the noise-suppression component 430 to remove noise from the audio data of the voice message prior to the voice message being transmitted to a recipient device.

Figure 5B:
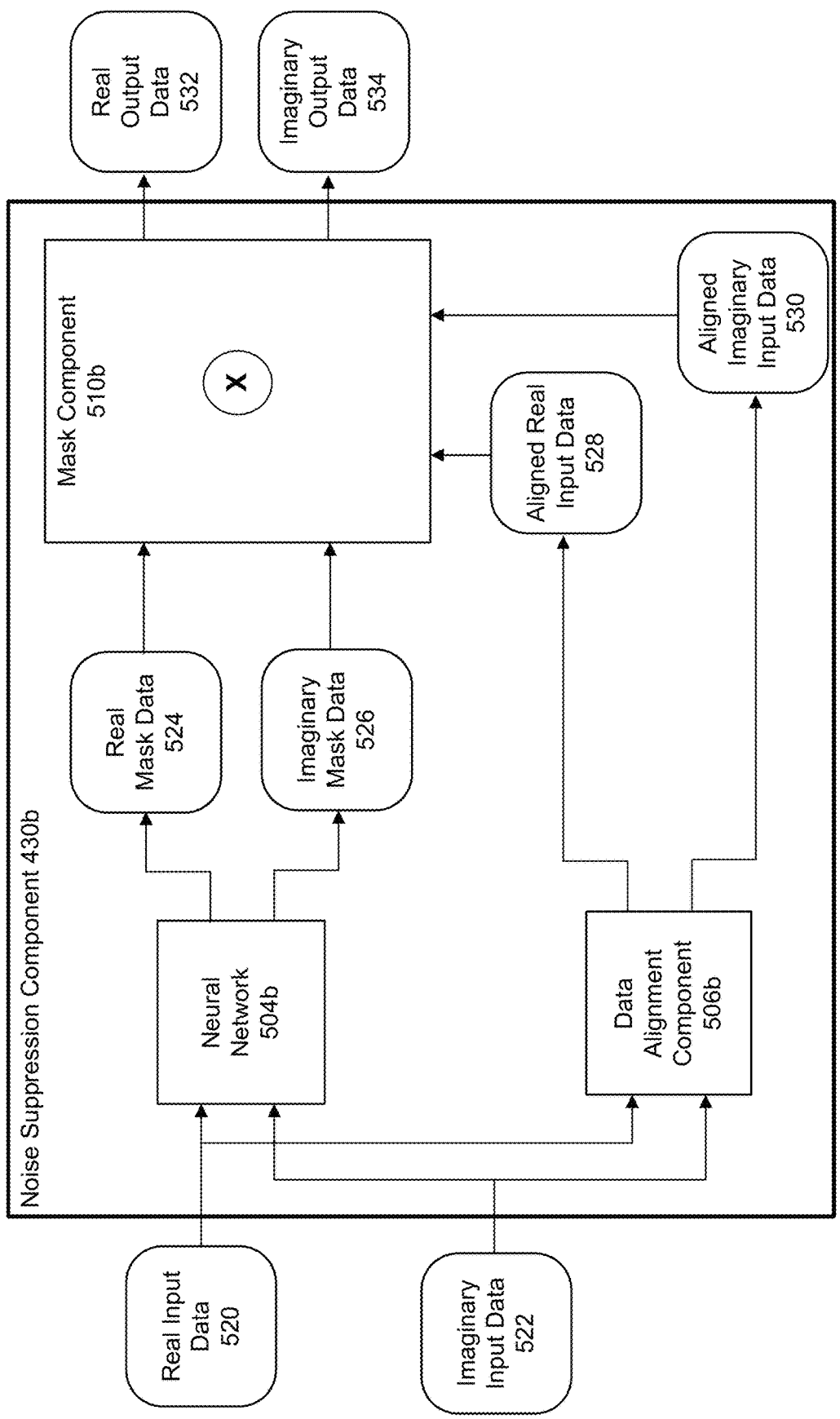
Figure 5C:
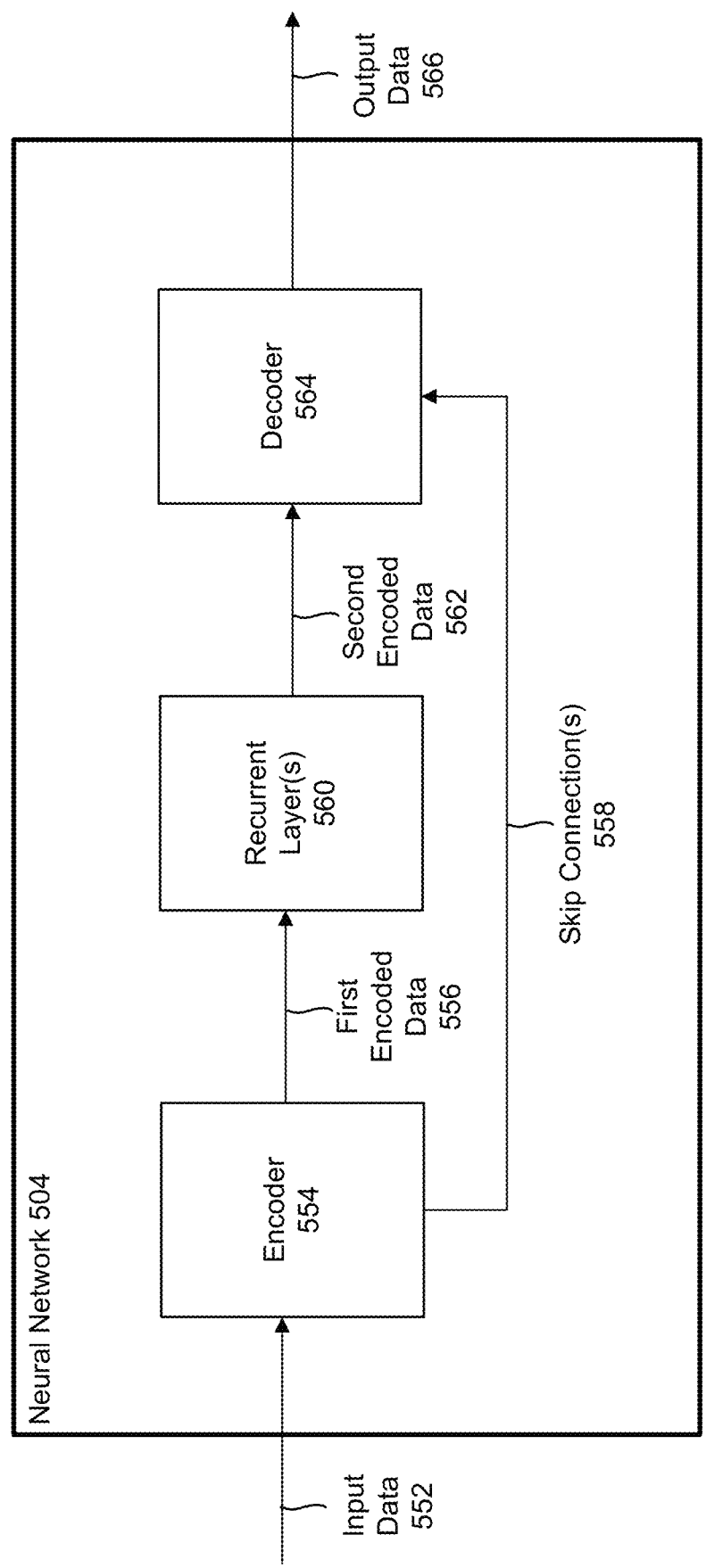

FIGS. 5A and 5B illustrate noise-suppression components 430 of an autonomously motile device, FIG. 5C illustrates a neural network 504 of the noise-suppression component(s) 430, and FIG. 5D illustrates a mask component 510 of the noise-suppression component(s) 430 according to embodiments of the present disclosure. Although illustrated as operated by device 110, the noise-suppression component 430 and/or noise suppression controller 450, and/or portions thereof, may be operated by a remote system 1200 (discussed below), such as one or more cloud servers that receive audio data and may operate to remove noise from received audio data along with further processing (for example speech processing). Referring first to FIG. 5A, the neural network 504a described herein may process input data 502 to determine mask data 508. The input data 502 may be a two-dimensional matrix of data in which one dimension is a number of frequency bins and a second dimension is a number of frames. The neural network 504a may process the input data 502 to determine corresponding mask data 508, which is described in greater detail with reference to FIG. 5D.

A data alignment component 506a may process the input data 502 to determine aligned input data 512. The neural network 504a may be associated with a latency corresponding to a delay between processing input data 502 and outputting mask data 508 corresponding to the input data 502. For example, the neural network 504a may be able to process a frame of input data 502 at a first time $t_1$; the neural network 504a may output corresponding mask data 508 at a second time $t_2$, wherein, $t_2 > t_1$. The latency may correspond to a number of layers of the neural network 504a; a greater number of layers may imply a greater latency. The data alignment component 506a may determine this latency and/or may be preprogrammed with this latency. The data alignment component 506a may delay (for example by storing in a buffer before outputting) a given frame of input data 502 in accordance with the latency such that a frame of aligned input data 512 corresponds to an item of mask data 508. In another embodiment one particular frame of input data 502 may be labelled with a particular identifier which is passed forward such that the mask data 508 associated with the particular frame is also associated with the same particular identifier so the particular mask data is applied to the particular input data using mask component 510.

The mask component 510a may then process the mask data 508 and the aligned input data 512 to determine output data 514. As explained in greater detail with reference to FIG. 5D, the mask component 510a may include a number of multiplication components that each receive as input a first item of mask data 508 and corresponding item of aligned input data 512.

Referring to FIG. 5B, the input data may be separated into real input data 520 and imaginary input data 522. A neural network 504b may process both the real input data 520 and imaginary input data 522 to determine real mask data 524 and imaginary mask data 526. Similarly, the data alignment component 506b may process the real input data 520 and imaginary input data 522 to determine aligned real input data 520 and aligned imaginary input data 522. The mask component 510b may process (e.g., multiply) the real mask data 524 and the aligned real input data 528 to determine real output data 532 and may process (e.g., multiply) the imaginary mask data 526 and the aligned imaginary input data 530 to determine imaginary output data 534. The mask component 510b may perform complex multiplication using the real (524) and imaginary (526) mask data, and the aligned real (528) and imaginary (530) input data to generate real (532) and imaginary (534) portions of the output data. As described above, a filter, such as the synthesis filterbank 410, may process the real 532 and imaginary 534 output data to determine audio data that includes a representation of the utterance 104.

As mentioned above, various techniques for training the neural network 504 are within the scope of the present disclosure. In some embodiments, both the input training data and target data (e.g., output training data) are normalized prior to training the neural network 504 using, for example, global mean-variance normalization (GMVN). In some embodiments, a first loss function may be used to evaluate the difference between target data and output data 514 when input training data includes a representation of both an utterance 104 and noise 108, and a second loss function may be used to evaluate the difference between target data and output data 514 when input training data includes a representation of noise 108 but not the utterance 104. These techniques are described in greater detail below.

The microphone data 402 may be modeled in accordance with the below Equation (1), which represents the microphone data y(n) at time index n.

$$y(n)=h*s(n)+v(n) \tag{1}$$

In Equation (1), h denotes an impulse response of the environment between the user 102 and the device 110, s(n) denotes the desired speech signal (e.g., the utterance 104), and v(n) denotes the noise 108. A signal x(n) may be defined in accordance with the below Equation (2).

$$x(n) \triangleq h*s(n) \tag{2}$$

Substituting Equation (2) into Equation (1) produces the below Equation (3).

$$y(n)=x(n)+v(n) \tag{2}$$

Equation (1) may be expressed in the frequency domain in accordance with the below Equation (4); Equation (2) may be expressed in the frequency domain in accordance with the below equation (5).

$$Y(m,k)=H(k)S(m,k)+V(m,k) \tag{4}$$

$$Y(m,k)=X(m,k)+V(m,k) \tag{5}$$

In the above Equations (4) and (5), m represents the number of the frame of audio data and k represents the number of the frequency bin of the audio data, respectively. Using the noise-suppression component 430 to process the input data 502 to produce the output data 514 may thus be expressed as processing Y(m, k) to determine $\hat{X}(m, k)$, which is an estimate of X(m, k), to be as close as possible to X(m, k). If the processing of the noise-suppression component 430 is denoted by the operation by N{•}, the process of training the neural network 504 may thus be expressed by the below Equation (6).

$$N\{Y(m,k)\}=\hat{X}(m,k) \rightarrow X(m,k) \tag{6}$$

The neural network 502 may be trained using a supervised method, meaning that the training data may consist of pairs of input data 502 and corresponding target data X(m, k). The target data X(m, k) may include real data denoted by $X_R$(m, k) and imaginary data $X_I$(m, k). The training may be performed using subsets of the training data called "minibatches"; each minibatch may include L pairs of training data, and the supervised training procedure may minimize a mean squared error (MSE) loss between the target data and output data 514. An exemplary loss function L( ) for comparing the target data and output data 514 is shown below in Equations (7)-(9).

$$L(x,\hat{x}) = \frac{1}{L}(L_R(x,\hat{x}) + L_I(x,\hat{x})) \tag{7}$$

$$L_R(x,\hat{x}) = \frac{1}{KM} \sum_{l=1}^{L} \sum_{k=1}^{K} \sum_{m=1}^{M} |X_{R,l}(m,k) - \hat{X}_{R,l}(m,k)|^2 \tag{8}$$

$$L_I(x,\hat{x}) = \frac{1}{KM} \sum_{l=1}^{L} \sum_{k=1}^{K} \sum_{m=1}^{M} |X_{I,l}(m,k) - \hat{X}_{I,l}(m,k)|^2 \tag{9}$$

In the above equations, l represents the lth training sample in the minibatch, K represents the total number of frames of training data, and M represents the total number of frequency bins of training data.

As described herein, the variability in the dynamic range (e.g., loudness) of the utterance 104 may vary, for example from very quiet (−65 dB) to very loud (−5 dB). To address this variability, prior to training, the input training data and the target data may be modified using a normalization function, such as a global mean-variance normalization (GMVN) function. As described below, a first GMVN function may be used to modify the input training data, and a second GMVN function may be used to modify the target data. In some embodiments, the mean μ and standard deviation σ of the real R and imaginary I parts of the input training data are computed in accordance with the below Equations (10)-(13).

$$\mu_{Y,R}(k) = E\{Y_R(.,k)\} \tag{10}$$

$$\sigma_{Y,R}(k) = \sqrt{E\{|Y_R(.,k) - \mu_{Y,R}(k)|^2\}} \tag{11}$$

$$\mu_{Y,I}(k) = E\{Y_I(.,k)\} \tag{12}$$

$$\sigma_{Y,I}(k) = \sqrt{E\{|Y_I(.,k) - \mu_{Y,I}(k)|^2\}} \tag{13}$$

In the above equations, E{•} represents a statistical mean operation, which may be computed over a number of frames K. Equations (14) and (15) define a GMVN function, which may include an affine transformation, operating on the above-defined mean μ and standard deviation σ of the real R and imaginary I parts of the input training data.

$$\tilde{Y}_R(k) = \frac{Y_R(k) - \mu_{Y,R}(k)}{\sigma_{Y,R}(k)} \tag{14}$$

$$\tilde{Y}_I(k) = \frac{Y_I(k) - \mu_{Y,I}(k)}{\sigma_{Y,I}(k)} \tag{15}$$

The affine transformation applied in Equations (14) and (15) may cause the modified input training data to resemble a Gaussian random variable having zero mean and unit variance.

In addition to applying GMVN function of Equations (14) and (15) on the input training data, a same or different GMVN function may be used to modify the target data. The different GMVN function applied to the target data may use the mean μ and standard deviation σ defined below in Equations (16)-(19).

$$\mu_{X,R}(k) = E\{X_R(.,k)\} \tag{16}$$

$$\sigma_{X,R}(k) = \sqrt{E\{|X_R(.,k) - \mu_{X,R}(k)|^2\}} \tag{17}$$

$$\mu_{X,I}(k) = E\{X_I(.,k)\} \tag{18}$$

$$\sigma_{X,I}(k) = \sqrt{E\{|X_I(.,k) - \mu_{X,I}(k)|^2\}} \tag{19}$$

Using the mean μ and standard deviation σ defined for the target data in Equations (16)-(19), the GMVN function for the target data may be defined as shown below in Equations (20) and (21).

$$\tilde{X}_R(k) = \frac{X_R(k) - \mu_{X,R}(k)}{\sigma_{X,R}(k)} \tag{20}$$

$$\tilde{X}_I(k) = \frac{X_I(k) - \mu_{X,I}(k)}{\sigma_{X,I}(k)} \tag{21}$$

In some embodiments, the GMVN functions for the target data defined by Equations (16)-(21) are applied to the target data only when the input training data includes a representation of an utterance. This training data that includes a representation of an utterance may be determined by annotation of the training data; for example, a human may listen to and annotate the training data accordingly. In other embodiments, the training data may be processed using a component configured to detect speech, such as a voice-activity detection (VAD) component. In still other embodiments, the training data may be derived from first data representing utterances and second data representing noise; in these embodiments, the training data that includes a representation of an utterance is determined upon creation of it. Applying the GMVN to the target data may similarly cause the processed target data to exhibit characteristics of a Gaussian random variable with zero mean and unit variance.

The input training data and corresponding target data may further include other features. In some embodiments, the input training data and corresponding target data includes representations of wide dynamic-range utterances (e.g., very quiet through very loud utterances). The input training data and corresponding target data may further include representations of a variety of different impulse responses corresponding to a variety of different environments, such as different types and sizes of rooms. The input training data and corresponding target data may further include representations of changes in the environment of the device 110, such as those caused by the device 110 moving to a different environment or a different part of an environment.

As described above, a first loss function may be used to evaluate the difference between target data and output data 514 when the input training data includes a representation of both an utterance 104 and noise 108, and a second loss function may be used to evaluate the difference between target data and output data 514 when the input training data includes a representation of noise 108 but not the utterance 104. The first loss function (when an utterance is present) may correspond to minimizing the error between the target data and the output data 514. This error may be referred to as a signal-to-error-ratio (SER), and the inverse of this term may be referred to as the error-to-signal-ratio (ESR). The second loss function (when an utterance is not present) may correspond to maximizing the amount of noise reduction. This maximization may correspond to measuring and maximizing the ratio of the powers of the input training data and the output data 514, which may be referred to as relative noise reduction (RNR). Maximizing both SER and RNR with a single loss function, such as the loss function defined by Equations (7)-(9), may be difficult.

Thus, as described above, pairs of input training data and target data may be annotated or otherwise determined to include a representation of an utterance and noise ("speech active") or noise but no utterance ("speech inactive"). For L training instances of a minibatch of training data $K_l$, a number of speech-active frames $K_{X,l}$ and a number of speech-inactive frames $K_{X,l}$ may be determined in accordance with Equation (22).

$$K_l = K_{X,l} + K_{V,l} \tag{22}$$

The total number of speech-active and speech-inactive frames for the minibatch may be defined in accordance with Equations (23) and (24).

$$K_X = \sum_{l=1}^{L} K_{X,l} \tag{23}$$

$$K_V = \sum_{l=1}^{L} K_{V,l} \tag{24}$$

The average speech power for a speech-active region for the lth training example may be defined as $\sigma_{X,l}^2$, and the average noise power for a speech-inactive region for the lth training example may be defined as $\sigma_{V,l}^2$. The first loss function for a speech-active frame(s) may thus be defined by the below Equations (25)-(27).

$$L_X(\tilde{x}, \hat{\tilde{x}}) = \frac{1}{L}\left(L_{R,X}(\tilde{x}, \hat{\tilde{x}}) + L_{I,X}(\tilde{x}, \hat{\tilde{x}})\right) \tag{25}$$

$$L_{R,X}(\tilde{x}, \hat{\tilde{x}}) = \frac{1}{K_X M} \sum_{l=1}^{L} \sum_{k=1}^{K_{X,l}} \sum_{m=1}^{M} \frac{|\tilde{X}_{R,l}(m,k) - \hat{\tilde{X}}_{R,l}(m,k)|^2}{\sigma_{X,l}^2} \tag{26}$$

$$L_{I,X}(\tilde{x}, \hat{\tilde{x}}) = \frac{1}{K_X M} \sum_{l=1}^{L} \sum_{k=1}^{K_{X,l}} \sum_{m=1}^{M} \frac{|\tilde{X}_{I,l}(m,k) - \hat{\tilde{X}}_{I,l}(m,k)|^2}{\sigma_{X,l}^2} \tag{27}$$

Similarly, the second loss function for a speech-inactive frame(s) may thus be defined by the below Equations (28)-(30).

$$L_V(\tilde{x}, \hat{\tilde{x}}) = \frac{1}{L}\left(L_{R,V}(\tilde{x}, \hat{\tilde{x}}) + L_{I,V}(\tilde{x}, \hat{\tilde{x}})\right) \tag{28}$$

$$L_{R,V}(\tilde{x}, \hat{\tilde{x}}) = \frac{1}{K_V M} \sum_{l=1}^{L} \sum_{k=1}^{K_{V,l}} \sum_{m=1}^{M} \frac{|\hat{\tilde{X}}_{R,l}(m,k)|^2}{\sigma_{V,l}^2} \tag{29}$$

$$L_{I,V}(\tilde{x}, \hat{\tilde{x}}) = \frac{1}{K_V M} \sum_{l=1}^{L} \sum_{k=1}^{K_{V,l}} \sum_{m=1}^{M} \frac{|\hat{\tilde{X}}_{I,l}(m,k)|}{\sigma_{V,l}^2} \tag{30}$$

The loss function for all types of frames is shown below in Equation (31).

$$L(\tilde{x}, \hat{\tilde{x}}) = \lambda L_X(\tilde{x}, \hat{\tilde{x}}) + (1 - \lambda) L_V(\tilde{x}, \hat{\tilde{x}}) \tag{31}$$

In Equation (31), $\lambda \in [0, 1]$ is a tuning parameter that allows selection between the influence of the first loss function of Equations (25)-(27) versus the second loss function of Equations (28)-(30). The tuning parameter $\lambda$ may vary based on the downstream application that may process the output data 514. For example, the tuning parameter $\lambda$ may be set at 1 or close to 1 for ASR applications while, for VOIP applications, the tuning parameter $\lambda$ may be lower (e.g. 0.5).

As shown in FIG. 5C, the neural network 504 may include an encoder 554 for processing input data 552 to determine first encoded data 556. The input data 552 may be the output of the microphone array 210, the output of the acoustic echo cancellation component 406, and/or the output of the beamformer 420. The noise-suppression component 430 may further include one or more recurrent layer(s) 560 for processing the first encoded data 556 to determine second encoded data 562. The noise-suppression component 430 may further include a decoder 564 for processing the second encoded data 562 to produce output data 566. The output data may be processed by the synthesis filterbank 410 to produce output audio data 416.

The device 110 may send the output data 566 and/or the output audio data 416 to a different component, such as a wakeword-detection component 1138, for further processing. Alternatively or in addition, the device 110 may send the output data and/or the output audio data 416 to other components, such as an acoustic-event detection component. The device 110 may send the output data 566 and/or audio output data 416 to a remote system 1200 for further processing, such as ASR/NLU processing, or to another device 112 for output thereon (e.g., as part of audio communication). The noise-suppression component 430 may further include one or more skip connections 558 that provide one or more outputs of the encoder 554 directly to the decoder 564 (e.g., without being first processed by the recurrent layer(s) 560. Details of each of these components is described in greater detail below.

The first encoded data 556 may be a vector of N floating-point numbers; N may be, for example, 1024. The numbers of the first encoded data 556 may collectively uniquely identify one or more items of input data 552, which may be the input data 502, real input data 520, and/or imaginary input data 522. That is, for first input data 552 corresponding to a first utterance 104 and/or first noise 108, the encoder 554 may determine first corresponding first encoded data 556. For second input data 552 corresponding to a second utterance 104 and/or second noise 108 different from the first utterance 104 and/or first noise 108, the encoder 554 may determine second corresponding first encoded data 556 different from the first corresponding first encoded data 556.

A vector represented by the first encoded data 556 may thus be regarded as a point in an N-dimensional embedding space; the N-dimensional embedding space spans a number of possible utterances (by various speakers) and possible noise. When a particular utterance and/or noise is represented in the input data 552, the encoder 554 determines corresponding first encoded data 556, which represents the point in the embedding space corresponding to that particular utterance and/or noise. As mentioned above, the encoder 554 may be trained using training data; during training, the encoder 554 may define the embedding space automatically (an "autoencoder") as values of the noise-suppression component 430 are updated to match target values corresponding to the training data.

As mentioned above, the input data 552 may be organized in frames, and the encoder 554 may thus process successive frames of input data 552. Each frame may correspond to a time period of received audio; this time period may be, for example, 10 milliseconds. The encoder may process overlapping frames of input data 552; for example, the encoder 554 may process a 10 millisecond frame every 1 millisecond. In this example, a second-processed frame overlaps a first-processed frame by 9 milliseconds. Any size frame and any amount of overlap is, however, within the scope of the present disclosure.

As described herein, the encoder 554 may include a number of neural-network layers, such as a number of CNN layers. A first layer may thus process a frame of input data 552 while a second layer processes an output of the first layer, and so on. The first encoded data 556 may thus depend on a number of frames of input data corresponding to a number of layers of the encoder 554. This number of frames and layers may be, for example, between 2 and 50. The number of layers and frames may correspond to a duration of time it takes to speak an average word; for example, 500 milliseconds.

The one or more recurrent layer(s) 560 process the first encoded data 556 output by the encoder 554 to determine second encoded data 562. In some embodiments, the recurrent layer(s) 560 include two layers of RNN cells, such as the LSTM cell 900 of FIG. 9; the recurrent layer(s) 560 may include other types of RNN cells, such as GRU cells. In some embodiments, the dimension of the first encoded data 556 is the same as the dimension of the second encoded data 562; this dimension may be, for example, 128. In other words, the recurrent layer(s) 560 may include 256 RNN cells arranged in two layers. Cells in the first layer may be fully or partially connected to cells in the second layer.

Each cell in the recurrent layer(s) 560 may include a recurrent connection from itself and/or from another cell. Each cell may thus receive two inputs: a first input comprising or derived from the incoming first encoded data 556 and a second recurrent input derived from previously received first encoded data 556. The two inputs may be weighted so that the output of the cell depends on a certain percentage of the first input and a different percentage of the second input. For example, the cell may weight the first input by 0.75 and weight the second input by 0.25 (e.g., 1—the first weight), meaning that the output of the cell depends 75% on the first input and 25% on the second input. In this way, the cell may "remember" a certain amount of information from previously received first encoded data 556 while still processing newly arrived first encoded data 556. This processing may be achieved using, for example, the forget gate 902 discussed below with reference to FIG. 9.

The decoder 564 processes the second encoded data 562 determined by the recurrent layer(s) 560 to determine output data 566. As mentioned above, the output data 566 may include magnitude data (such as magnitude spectrogram data) and/or phase data (such as phase spectrogram data). The output data 566 may represent a version of the input data 552 that represents a version of the utterance 104 and a suppressed version of the noise 108. The magnitude data and the phase data may be combined (e.g., multiplied, added, or concatenated) to determine magnitude and phase data, which may then be processed by the synthesis filterbank 410 to create output audio data 416. As described above, the output audio data 416 may be time-domain data that includes a representation of the utterance, and may be sent to another device 112 and/or system 1200 for further processing, such as wakeword and/or ASR processing.

Like the encoder 554, the decoder 564 may include a number of neural-network layers, such as a number of CNN layers, and may similarly be a causal network. A first layer may process a first item of second encoded data 562 while a second layer processes an output of the first layer, and so on. The output data 566 may thus depend on a number of items of second encoded data 562 corresponding to a number of layers of the decoder 564.

Similar to how the encoder 554 is trained to map one or more frames of input data 552 representing an utterance and noise to a point in the embedding space determined during training, the decoder 564 may be trained to decode a determined point in the embedding space to output data 566 representing the utterance and suppressed noise. For example, a given item of training data may include input training data, such as audio representing "What is the <honk> weather?" (wherein the <honk> is a car horn), and target training data, such as audio representing "What is the weather?". The encoder 554 and/or recurrent layer(s) 560 may be trained to map the input training data to a particular N-vector as represented by the second encoded data 562. The decoder 564 may similarly be trained such that, when that particular N-vector appears in the second encoded data 562, the decoder 564 outputs output data 566 that represents "What is the weather?". When the input data 552 represents a similar utterance and noise, the encoder 554 and/or recurrent layer(s) 560 determine a similar N-vector, and the decoder 564 outputs similar output data 566.

As mentioned above, one or more skip connection(s) 558 may directly connect the encoder 554 and the decoder 564. As discussed below with reference to FIGS. 8A-8C, the encoder 554 and/or decoder 564 may include one or more dense layers, in which a given layer of the encoder 554 and/or decoder 564 is not just connected to a preceding layer, but also to at least one other preceding layer. Because these extra connections may make the training process more complicated (e.g., make the gradient descent algorithm more difficult to compute), the one or more skip connection(s) 558 may be added to ease the training process. In other words, as updated network values, such as weights and offsets, are back-propagated throughout the noise-suppression component 430, the skip connection(s) 558 may provide a more direct path from the decoder 564 to the encoder 554, thus allowing more direct computation of the updated values of the encoder 554.

A noise-suppression controller 450 may be used to control the noise-suppression component 430 and/or other components, such as the beamformer 420. As mentioned herein, noise suppression using the beamformer 420 may exhibit deleterious performance when the device 110 is moving. The noise-suppression controller 450 may thus first determine if the device 110 is moving or is at rest. The noise-suppression controller 450 may, for example, receive data from one or more sensors 1054 of the device 110, such as an accelerometer 1182, gyroscope 1181, and/or camera 212 and process the sensor data to determine the state of the device 110. For example, the noise-suppression controller 450 may determine that the device is moving if an acceleration determined by the accelerometer 1182 is nonzero.

If the noise-suppression controller 450 determines that the device 110 is moving, it may send a signal to the beamformer 420 to cease performing noise suppression and send a signal to the noise-suppression component 430 to begin (or continue to) perform noise suppression. Similarly, if the noise-suppression controller 450 determines that the device 110 is at rest, it may send a signal to the beamformer 420 to begin (or continue to) perform noise suppression and send a signal to the noise-suppression component 430 to cease perform noise suppression.

The noise-suppression controller 450 may instead or in addition control the beamformer 420 and/or noise-suppression component 430 based on other determinations. For example, the device 110 may be at rest, but the user 102 and the noise source 106 may be disposed in the same beam (e.g., the user 102 is standing next to the noise source and/or in front of/behind the noise source with respect to the device 110) and the device is thus unable to separate the user 102 and the noise source 106 into separate beams. The noise-suppression controller 450 may thus send a signal to the noise-suppression component 430 to begin suppressing noise. In other embodiments, the device 110 may be moving, but the noise source 106 may be a second utterance (from, e.g., another person or from playback of a recorded utterance). The noise-suppression component 430 may thus be unable to distinguish between the utterance 104 of the user 102 and the second utterance in the noise 108. The noise-suppression controller 450 may thus send a signal to the beamformer 420 to begin suppressing noise.

As shown in FIG. 5D, the mask component 510 may process the input data 512 using the mask data 508 to produce the output data 514. The mask component 510 may multiply a given value of the input data 512 with a corresponding value of mask data 508. For example, the mask component 510 may multiply a first item of input data A 572a with a first item of mask data A 570a to determine a first item of output data 574a, a second item of input data B 572b with a second item of mask data 570b to determine a second item of output data 574b, and so on. The present disclosure is not limited to any particular number of items of mask data 508 and input data 512. As explained above, the mask data may include zeroes and ones (a binary mask) that include items of input data 512 that correspond to frequencies associated with the utterance 104 and delete items of input data 512 that correspond to frequencies associated with the noise 108. The mask data may instead or in addition include floating-point numbers, for example between zero and one (a ratio mask) to thereby include a portion of the frequencies associated with the utterance 104 and a portion of the frequencies associated with the noise 108. The values of the mask data 508 may be determined by training the noise suppression component 430 with items of training data, as described here. That is, by comparing the output data 514 with target data using a loss function(s), the values of the mask data 508 may be determined using an algorithm, such as a gradient descent algorithm, and back-propagating values determined for an output layer of the neural network 504 to other layers of the neural network 504.

In one example the masking may be bitwise masking. For example, the mask component 510 may multiply a given value of the input data 512 (corresponding to a specific bit location in the input data 512) with a corresponding value of mask data 508 (corresponding to the same specific bit location in the mask data 508). In another example mask data may be applied to a particular time-frequency tile in the input data 512. Each tile represents a segment of input audio data. In one example one section of audio data may be divided into 161 frequency bins and 100 time frames, but such divisions are configurable. Depending on the signal conditions a tile may be speech dominant or noise dominant. The mask data 508 may be applied (for example as a complex gain) to reduce magnitude/energy/volume levels of one or more noise dominant tiles within a frame of input data 512 so the speech dominant tiles become dominant within the frame of the output data 514.

FIGS. 6A and 6B illustrate encoders of an autonomously motile device according to embodiments of the present disclosure. Referring first to FIG. 6A, as mentioned above, an encoder 554a may include any number of layers, such as N layers. In some embodiments, the encoder 554a includes a number of pairs of layers; a number of dense layer(s) 602 and a number of output layer(s) 604. A first dense layer 602a may receive and process input data 552 (or other input data, such as data output by another layer), and a first output layer 604a may process the output of the first dense layer 602a. A second dense layer 602b may receive and process the output of the first output layer 604a, and so on. A final output layer 604n may determine the first encoded data 556. As mentioned above, the output layers 604 may output one or more skip connections 558. Each skip connection 558 may be an output of an output layer 604 that is received by both a next dense layer 602 and the encoder 554. In various embodiments, the skip connections 558 output by a given output layer 604 comprise half of the outputs of the output layer 604. The skip connections 558 may correspond to, for example, every other output of the output layer 604.

Each dense layer 602 may perform an A×B two-dimensional convolution, wherein A and B are any integers and A corresponds to a number of frames of input data and B corresponds to a number of frequency bins. In some embodiments, A=1 and B=3; the present disclosure is not, however, limited any particular values of A and B. The dense layer 602 may further feature a growth rate G that defines a number of outputs produced for a given input. These outputs may be collectively referred to as a feature map. In some embodiments, G=32.

Each output layer 604 may similarly perform a C×D two-dimensional convolution and may produce H feature maps. In some embodiments, C=1, D=3, and H=32, but the present disclosure is not limited to any particular values for C, D, and H, and they may be any integers. In some embodiments, the dense layer 602 and/or output layer 604 may include other types of layers, such as a pooling layer or fully connected layer. A pooling layer may reduce the dimensionality of input data by downsampling; a max-pooling layer, for example, determines a maximum value of an N×M matrix of input data and replaces the matrix with that single value in its output data. A fully connected layer is a layer in which each node of the layer is fully connected to each node in preceding and following layers, and may improve convergence in training.

FIG. 6B illustrates one embodiment of an encoder 554b having five pairs of dense layers 602 and output layers 604.

TABLE 1

| Encoder 554b Input and Output Dimensions | | |
|---|---|---|
| Layer | Input Dimension | Output Dimension |
| 602a/604a | 2 × T × 161 | 32 × T × 80 |
| 602b/604b | 32 × T × 80 | 32 × T × 39 |
| 602c/604c | 32 × T × 39 | 32 × T × 19 |
| 602d/604d | 32 × T × 19 | 32 × T × 9 |
| 602e/604e | 32 × T × 9 | 32 × T × 4 |

In the above table, T refers to the number of frames of input data 552, the growth rate is 32, and the input dimension of the first layer 602a is multiplied by two to reflect that the input data is split into magnitude/phase or real/imaginary parts.

Figure 7A:
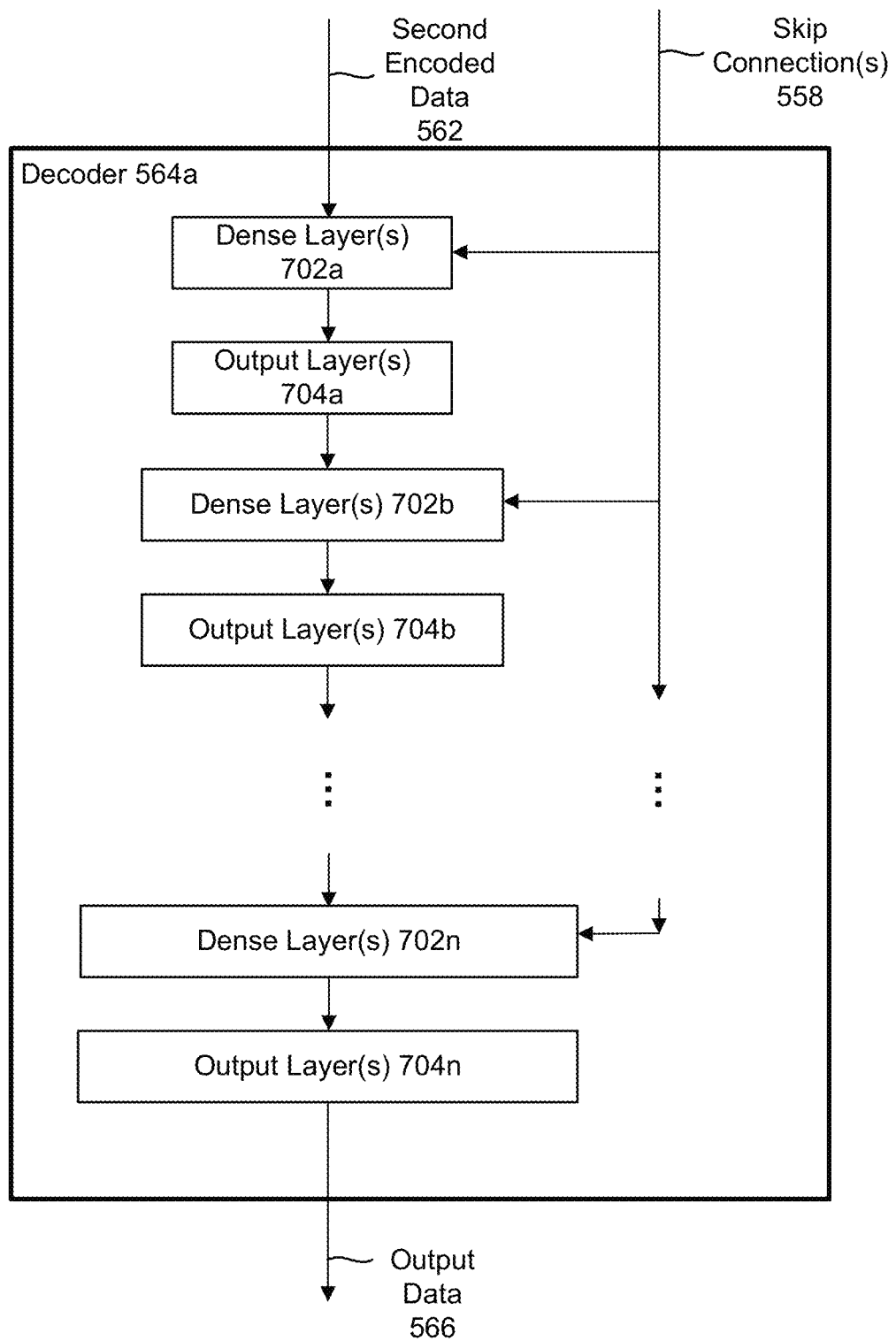
FIGS. 7A and 7B illustrate decoders of an autonomously motile device according to embodiments of the present disclosure.
Figure 7B:
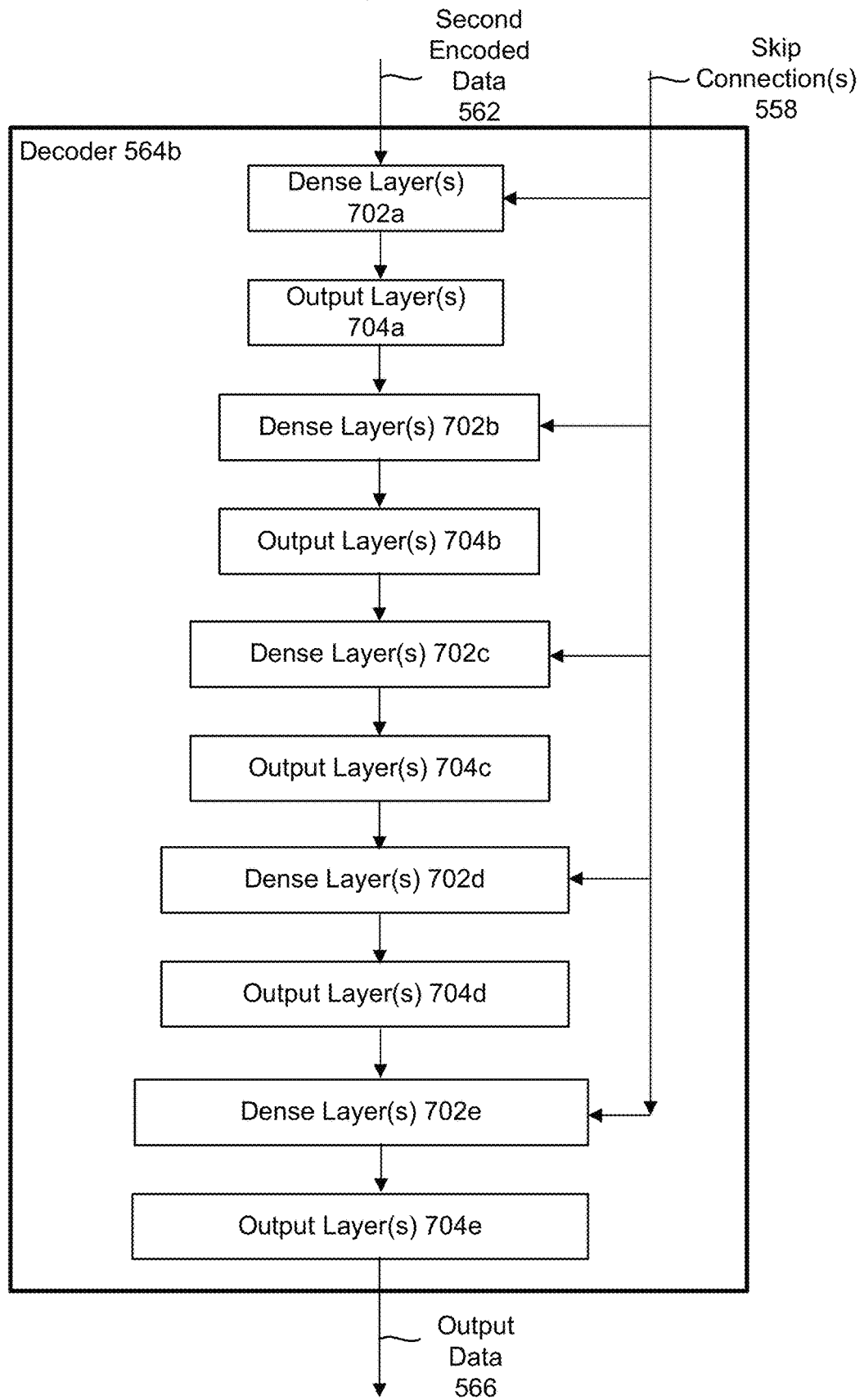

FIGS. 7A and 7B illustrate decoders of an autonomously motile device according to embodiments of the present disclosure. Referring first to FIG. 7A, like the encoder 554a of FIG. 6A, the decoder 564a may include any number of layers, such as N layers. In some embodiments, the decoder 564a also includes a number of pairs of layers; a number of dense layer(s) 702 and a number of output layer(s) 704. A first dense layer 702a may receive and process second encoded data 562 (or other input data, such as data output by another layer), and a first output layer 704a may process the output of the first dense layer 702a. A second dense layer 702b may receive and process the output of the first output layer 704a, and so on. A final output layer 704n may determine the output data 566. As mentioned above, the dense layers 702 may input one or more skip connections 558. Each skip connection 558 may be an output of an output layer 604. In various embodiments, the skip connections 558 input by a given dense layer 702 comprise half of the inputs of the dense layer 702. The skip connections 558 may correspond to, for example, every other input of the dense layer 702.

Each dense layer 602 may perform a transpose A×B two-dimensional convolution, wherein A and B are any integers and A corresponds to a number of frames of input data and B corresponds to a number of frequency bins. In some embodiments, A=1 and B=3; the present disclosure is not, however, limited any particular values of A and B. The dense layer 602 may further feature a growth rate G that defines a number of outputs produced for a given input. These outputs may be collectively referred to as a feature map. In some embodiments, G=32.

FIG. 7B illustrates one embodiment of a decoder 564b having five pairs of dense layers 702 and output layers 704.

TABLE 2

Decoder 564b Input and Output Dimensions

| Layer | Input Dimension | Output Dimension |
|---|---|---|
| 702a/704a | 32 × T × 4 | 32 × T × 9 |
| 702b/704b | 32 × T × 9 | 32 × T × 19 |
| 702c/704c | 32 × T × 19 | 32 × T × 39 |
| 702d/704d | 32 × T × 39 | 32 × T × 80 |
| 702e/704e | 32 × T × 80 | 2 × T × 161 |

In the above table, T refers to the number of items of second encoded data 562, the growth rate is 32, and the output dimension of the last layer 702e is multiplied by two to reflect that the output data is split into magnitude/phase or real/imaginary parts.

Figure 8B:
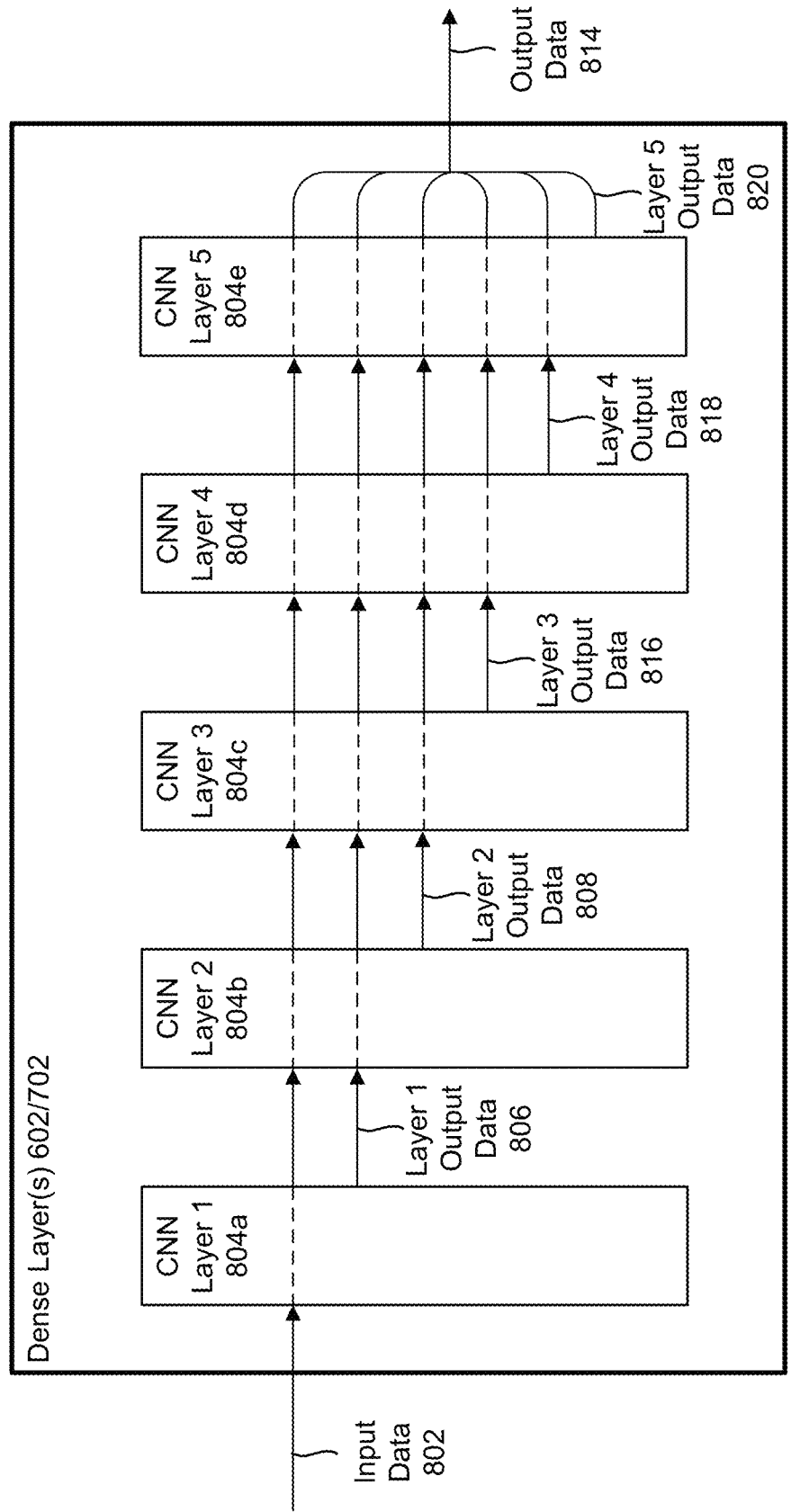
Figure 8C:
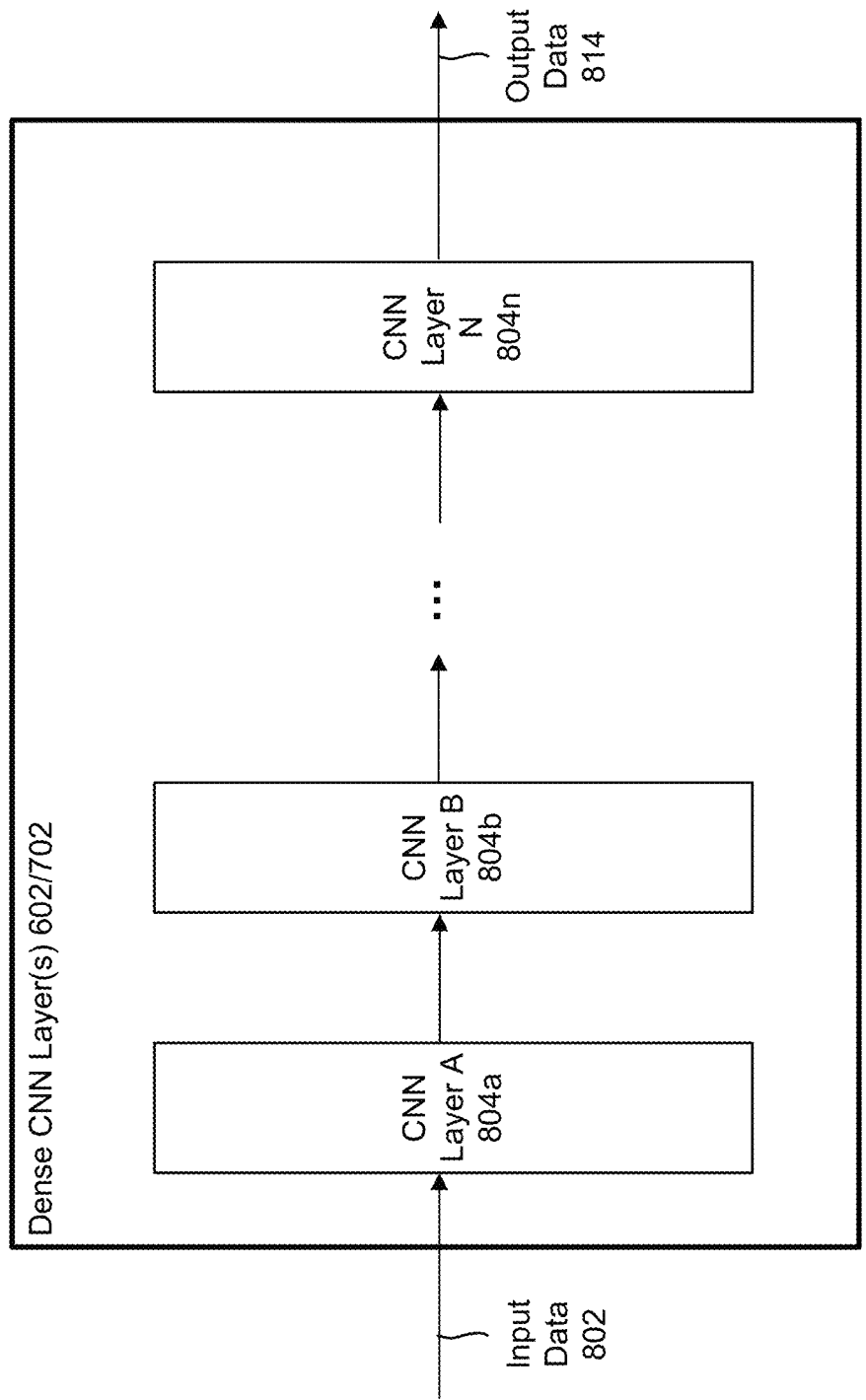

FIGS. 8A-8C illustrate dense layers 602/702 of an autonomously motile device 110 according to embodiments of the present disclosure. Referring first to FIG. 8A, as explained above, a given layer 804 of the dense layer(s) 602/702 may receive inputs from not just a preceding layer but two or more preceding layers (and/or from input data 802). In some embodiments, each layer 804 receives inputs from every preceding layer and from the input data 802. As shown in FIG. 8A, each layer 804 (which may be a CNN layer) receives the input data 802, such as a first layer 804a. A second layer 804b receives the input data 802 as well as the output of the first layer 804a, and so on. Thus, each successive layer of the dense layer 602/702 may receive and output twice as much data as its preceding layer. This doubling of the output may be achieved by increasing the dimensionality of successive layers 804 (e.g., adding nodes) and/or by outputting more data over time.

Referring to FIG. 8B, in some embodiments, the dense layers 602/702 include five CNN layers 804, each of which is fully connected to each proceeding layer and to the input data 802. For example, a last layer 804e receives the input data 802, layer 1 output data 806, layer 2 output data 808, layer 3 output data 816, and layer 4 output data 818 to produce layer 5 output data 820. The output data 814 includes representations of these items of output data. The present disclosure is not, however, limited to only fully connected dense blocks 602/702, and any subset of connections is within the scope of the present disclosure. For example, FIG. 8C illustrates a dense layer 602/702 with no dense connections; each layer 804 receives only the output of the preceding layer 804.

Figure 9:
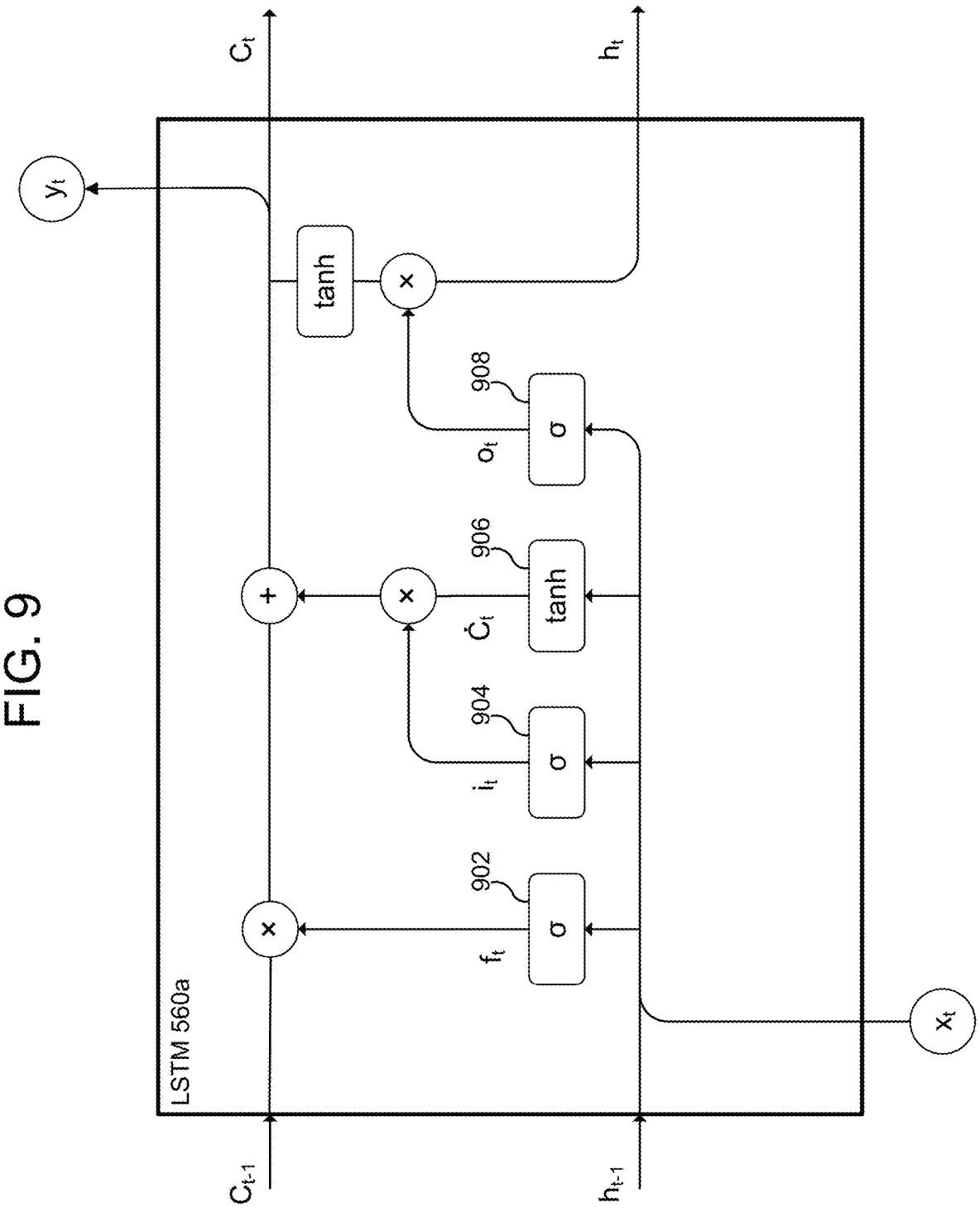
FIG. 9 illustrates a recurrent neural network cell according to embodiments of the present disclosure.

FIG. 9 illustrates an exemplary RNN cell, which is a long short-term memory (LSTM) cell 900, capable of learning long-term dependencies (e.g., capable of retaining data corresponding to 5-10 seconds of audio data). The LSTM cell 900 may be incorporated in, for example, the recurrent layers 560 of FIG. 5. The LSTM cell 900 receives an input vector $x_t$ and generates an output vector $h_t$. The input vector $x_t$ may be the output of the encoder 554 and may include the first encoded data 556; the output vector $h_t$ may include the second encoded data 560.

The cell 900 may maintain a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 902, an "input gate" layer 904, a tanh layer 906, and a sigmoid layer 908.

The forget gate layer 902 may be used to remove information from the previous cell state $C_{t-1}$. The forget gate layer 902 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$.

The input gate layer 904 and the tanh layer 906 may be used to decide what new information should be stored in the cell state $C_{t-1}$. The input gate layer 904 determines which values are to be updated by generating a vector $i_t$ of numbers between 0 and 1 for information that should not and should be updated, respectively. The tanh layer 906 creates a vector $\dot{C}_t$ of new candidate values that might be added to the cell state $C_t$. The vectors $i_t$ and $\dot{C}_t$ may thereafter be combined and added to the combination of the previous state $C_{t-1}$ and the output $f_t$ of the forget gate layer 902 to create an update to the state $C_t$.

Once the new cell state $C_t$ is determined, the sigmoid layer 908 may be used to select which parts of the cell state $C_t$ should be combined with the input $x_t$ to create the output $h_t$. These values may be further updated by sending them again through the cell 900 and/or through additional instances of the cell 900.

FIG. 10 is a block diagram of some components of the autonomously motile device 110 such as network interfaces 1019, sensors 1054, and output devices, according to some implementations. The components illustrated here are provided by way of illustration and not necessarily as a limitation. For example, the autonomously motile device 110 may utilize a subset of the particular network interfaces 1019, output devices, or sensors 1054 depicted here, or may utilize components not pictured. One or more of the sensors 1054, output devices, or a combination thereof may be included on a moveable component that may be panned, tilted, rotated, or any combination thereof with respect to a chassis of the autonomously motile device 110.

With reference also to FIG. 12, the autonomously motile device 110 and/or server 1200 may include input/output device interfaces 1002/1202 that connect to a variety of components such as an audio output component like a loudspeaker 1012, a wired or wireless headset, or other component capable of outputting audio. The autonomously motile device 110 may also include an audio capture component. The audio capture component may be, for example, a microphone 1020 or array of microphones 262, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 212/216, light, button, actuator, and/or sensor 1054.

The network interfaces 1019 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 302 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1002/1202) may also include and/or communicate with communication components (such as network interface(s) 1019) that allow data to be exchanged between devices such as different physical servers in a collection of servers or other components.

The components of the device(s) 110 and/or the system(s) 1200 may include their own dedicated processors, memory, and/or storage. Alternatively, one or more of the components of the device(s) 110 and/or the system(s) 1200 may utilize the I/O interfaces (1002/1202), processor(s) (1004/1204), memory (1006/1206), and/or storage (1008/1208) of the device(s) 110 and/or the system(s) 1200, respectively. The components may communicate with each other via one or more busses (1024/1224).

FIG. 11A illustrates components that may be stored in a memory of an autonomously motile device according to embodiments of the present disclosure. Although illustrated as included in memory 1006, the components (or portions thereof) may also be included in hardware and/or firmware. FIG. 11B illustrates data that may be stored in a storage of an autonomously motile device according to embodiments of the present disclosure. Although illustrated as stored in storage 1008, the data may be stored in memory 1006 or in another component. FIG. 11C illustrates sensors that may be included as part of an autonomously motile device according to embodiments of the present disclosure.

A position determination component 1132 determines position data 1144 indicative of a position 310 of the feature in the environment 302. In one implementation the position 310 may be expressed as a set of coordinates with respect to the first camera 212a. The position determination component 1132 may use a direct linear transformation triangulation process to determine the position 310 of a feature in the environment 302 based on the difference in apparent location of that feature in two images acquired by two cameras 212 separated by a known distance.

A movement determination module 1133 determines if the feature is stationary or non-stationary. First position data 1144a indicative of a first position 310a of a feature depicted in the first pair of images acquired at time $t_1$ is determined by the position determination component 1132. Second position data 1144b of the same feature indicative of a second position 310b of the same feature as depicted in the second pair of images acquired at time $t_2$ is determined as well. Similar determinations made for data relative to first position 310a and second position 310b may also be made for third position 310c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature at the second time. The predicted position is compared to the second position data 1144b to determine if the feature is stationary or non-stationary. If the predicted position is less than a threshold value from the second position 310b in the second position data 1144b, then the feature is deemed to be stationary.

Features that have been deemed to be stationary may be included in the second feature data. The second feature data may thus exclude non-stationary features and comprise a subset of the first feature data 1148 which comprises stationary features.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features in pairs of images. The SLAM component 1134 may also provide trajectory data indicative of the trajectory 304 that is based on a time series of pose data 1145 from the SLAM component 1134.

Other information, such as depth data from a depth sensor, the position data 1144 associated with the features in the second feature data, and so forth, may be used to determine the presence of obstacles 306 in the environment 302 as represented by an occupancy map as represented by occupancy map data 1149.

The occupancy map data 1149 may comprise data that indicates the location of one or more obstacles 306, such as a table, wall, stairwell, and so forth. In some implementations, the occupancy map data 1149 may comprise a plurality of cells with each cell of the plurality of cells representing a particular area in the environment 302. Data, such as occupancy values, may be stored that indicates whether an area of the environment 302 associated with the cell is unobserved, occupied by an obstacle 306, or is unoccupied. An obstacle 306 may comprise an object or feature that prevents or impairs traversal by the autonomously motile device 110. For example, an obstacle 306 may comprise a wall, stairwell, and so forth.

The occupancy map data 1149 may be manually or automatically determined. For example, during a learning phase the user may take the autonomously motile device 110 on a tour of the environment 302, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 302.

Modules described herein, such as the mapping component 1130, may provide various processing functions such as de-noising, filtering, and so forth. Processing of sensor data 1147, such as image data from a camera 212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1147. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1147 or other data. For example, the ANN may be trained using a supervised learning algorithm such that object identifiers are associated with images of particular objects within training images provided to the ANN. Once trained, the ANN may be provided with the sensor data 1147 and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 306 as indicated by the occupancy map data 1149.

An autonomous navigation component 1136 provides the autonomously motile device 110 with the ability to navigate within the environment 302 without real-time human interaction. The autonomous navigation component 1136 may implement, or operate in conjunction with, the mapping component 1130 to determine one or more of the occupancy map data 1149, the navigation map data 1150, or other representations of the environment 302.

The autonomously motile device 110 autonomous navigation component 1136 may generate path plan data 1152 that is indicative of a path through the environment 302 from the current location to a destination location. The autonomously motile device 110 may then begin moving along the path.

While moving along the path, the autonomously motile device 110 may assess the environment 302 and update or change the path as appropriate. For example, if an obstacle 306 appears in the path, the mapping component 1130 may determine the presence of the obstacle 306 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 302 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1019 to connect to a network 199. For example, the network 199 may comprise a wireless local area network, that in turn is connected to a wide-area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 1200 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 1200 for further processing. The servers 1200 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomous motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth. One or more clocks may provide information indicative of date, time, ticks, and so forth. For example, the processor 1004 may use data from the clock to associate a particular time with an action, sensor data 1147, and so forth.

The autonomously motile device 110 may include one or more hardware processors 1004 (processors) configured to execute one or more stored instructions. The processors 1004 may comprise one or more cores. The processors 1004 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1002, network interfaces 1019, and so forth. The communication component 1140 enable the autonomously motile device 110, or components thereof, to communicate with other devices or components. The communication component 1140 may include one or more I/O interfaces 1002. The I/O interfaces 1002 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1002 may couple to one or more I/O devices. The I/O devices may include input devices such as one or more of a sensor 1054, keyboard, mouse, scanner, and so forth. The I/O devices may also include output devices such as one or more of a motor, light, speaker 1012, display 214, projector, printer, and so forth. In some embodiments, the I/O devices may be physically incorporated with the autonomously motile device 110 or may be externally placed.

The I/O interface(s) 1002 may be configured to provide communications between the autonomously motile device 110 and other devices such as other devices 110, docking stations, routers, access points, and so forth, for example through antenna 1010 and/or other component. The I/O interface(s) 1002 may include devices configured to couple to personal area networks (PANs), local area networks (LANs), wireless local area networks (WLANS), wide area networks (WANs), and so forth. For example, the network interfaces 1019 may include devices compatible with Ethernet, Wi-Fi, Bluetooth, Bluetooth Low Energy, ZigBee, and so forth. The autonomously motile device 110 may also include one or more busses 1024 or other internal communications hardware or software that allow for the transfer of data between the various modules and components of the autonomously motile device 110.

As shown in FIG. 11A, the autonomously motile device 110 includes one or more memories 1006. The memory 1006 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1006 provides storage of computer-readable instructions, data structures, program modules, and other data for the operation of the autonomously motile device 110. A few example functional modules are shown stored in the memory 1006, although the same functionality may alternatively be implemented in hardware, firmware, or as a system on a chip (SoC).

The memory 1006 may include at least one operating system (OS) component 1139. The OS component 1139 is configured to manage hardware resource devices such as the I/O interfaces 1002, the I/O devices, the communication component 1140, and provide various services to applications or modules executing on the processors 1004. The OS component 1139 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Wash.

Also stored in the memory 1006, or elsewhere may be a data store 1008 and one or more of the following modules. These modules may be executed as foreground applications, background tasks, daemons, and so forth. The data store 1008 may use a flat file, database, linked list, tree, executable code, script, or other data structure to store information. In some implementations, the data store 1008 or a portion of the data store 1008 may be distributed across one or more other devices including other devices 110, servers 1200, network attached storage devices, and so forth.

A communication component 1140 may be configured to establish communication with other devices, such as other devices 110, an external server 1200, a docking station, and so forth. The communications may be authenticated, encrypted, and so forth.

Other modules within the memory 1006 may include a safety component 1129, the mapping component 1130, the navigation map component 1135, the autonomous navigation component 1136, the one or more components 1141, a speech processing component 1137, or other components. The components may access data stored within the data store 1008, including safety tolerance data 1146, sensor data 1147, inflation parameters, other data, and so forth.

The safety component 1129 may access the safety tolerance data 1146 to determine within what tolerances the autonomously motile device 110 may operate safely within the environment 302. For example, the safety component 1129 may be configured to stop the autonomously motile device 110 from moving when an extensible mast 256 of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1054 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1054, precision and accuracy of the sensor data 1147, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 306 indicated by the occupancy map data 1149. One or more inflation parameters may be used during operation. The inflation parameters provide information such as inflation distance, inflation adjustment values, and so forth. In some implementations the inflation parameters may be based at least in part on the sensor field-of-view 308, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 1200 for speech processing. The audio data corresponding to audio obtained by the microphone may be processed locally on one or more of the processors 1004, sent to a server 1200 for routing to a recipient device or may be sent to the server 1200 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 1200, and so forth.

The speech processing component 1137 may include or access an automated speech recognition (ASR) module. The ASR module may accept as input raw audio data 1143, audio feature vectors, or other sensor data 1147 and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 302 without real-time human interaction. The autonomous navigation component 1136 may implement, or operate in conjunction with, the mapping component 1130 to determine the occupancy map data 1149, the navigation map data 1150, or other representation of the environment 302. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 302 and determine path plan data 1152 that describes the path to a destination location such as the docking station.

The autonomous navigation component 1136 may utilize various techniques during processing of sensor data 1147. For example, image data 1142 obtained from cameras 212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1004, in response to a command received from one or more network interfaces 1019, as determined from the sensor data 1147, and so forth. For example, an external server 1200 may send a command that is received using the network interface 1019. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction.

The autonomously motile device 110 may connect to the network 199 using one or more of the network interfaces 1019. In some implementations, one or more of the modules or other functions described here may execute on the processors 1004 of the autonomously motile device 110, on the server 1200, or a combination thereof. For example, one or more servers 1200 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1008 may store the other data as well. For example, localization settings may indicate local preferences such as language, user identifier data may be stored that allows for identification of a particular user, and so forth.

As shown in FIG. 11C, the autonomously motile device 110 may include one or more of the following sensors 1054. The sensors 1054 depicted here are provided by way of illustration and not necessarily as a limitation. It is understood that other sensors 1054 may be included or utilized by the autonomously motile device 110, while some sensors 1054 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 1147 obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor 1158 provides information indicative of motion of the autonomously motile device 110 relative to the floor or other surface underneath the autonomously motile device 110. In one implementation, the floor optical-motion sensors 1158 may comprise a light source such as light-emitting diode (LED), an array of photodiodes, and so forth. In some implementations, the floor optical-motion sensors 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1158 may provide other information, such as data indicative of a pattern present on the floor, composition of the floor, color of the floor, and so forth. For example, the floor optical-motion sensors 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1054 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 1147 indicative of one or more of a presence or absence of an object, a distance to the object, or characteristics of the object. The optical sensor 1160 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field-of-view 308 that is directed in a different way. For example, the optical sensor 1160 may have four light sensing elements, each associated with a different 10° field-of-view 308, allowing the sensor to have an overall field-of-view 308 of 40°.

In another implementation, a structured light pattern may be provided by the optical emitter. A portion of the structured light pattern may then be detected on the object using a sensor 1054 such as an image sensor or camera 212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 1147 indicative of the distance to an object in order to prevent a collision with that object.

Multiple optical sensors 1160 may be operated such that their field-of-view 308 overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1147 may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 302.

The autonomously motile device 110 may include a mast 256. A mast position sensor 1162 provides information indicative of a position of the mast 256 of the autonomously motile device 110. For example, the mast position sensor 1162 may comprise limit switches associated with the mast extension mechanism that indicate whether the mast 256 is at an extended or retracted position. In other implementations, the mast position sensor 1162 may comprise an optical code on at least a portion of the mast 256 that is then interrogated by an optical emitter and a photodetector to determine the distance to which the mast 256 is extended. In another implementation, the mast position sensor 1162 may comprise an encoder wheel that is attached to a mast motor that is used to raise or lower the mast 256. The mast position sensor 1162 may provide data to the safety component 1129. For example, if the autonomously motile device 110 is preparing to move, data from the mast position sensor 1162 may be checked to determine if the mast 256 is retracted, and if not, the mast 256 may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 1147 obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more of the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 1147 that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 1147 indicative of impinging light. For example, the photodetector 1170 may provide data indicative of a color, intensity, duration, and so forth.

A camera 212 generates sensor data 1147 indicative of one or more images. The camera 212 may be configured to detect light in one or more wavelengths including, but not limited to, terahertz, infrared, visible, ultraviolet, and so forth. For example, an infrared camera 212 may be sensitive to wavelengths between approximately 700 nanometers and 1 millimeter. The camera 212 may comprise charge coupled devices (CCD), complementary metal oxide semiconductor (CMOS) devices, microbolometers, and so forth. The autonomously motile device 110 may use image data acquired by the camera 212 for object recognition, navigation, collision avoidance, user communication, and so forth. For example, a pair of cameras 212 sensitive to infrared light may be mounted on the front of the autonomously motile device 110 to provide binocular stereo vision, with the sensor data 1147 comprising images being sent to the autonomous navigation component 1136. In another example, the camera 212 may comprise a 10 megapixel or greater camera that is used for videoconferencing or for acquiring pictures for the user.

The camera 212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 212, particularly those associated with navigation or autonomous operation, may utilize a global shutter. In other implementations, the camera(s) 212 providing images for use by the autonomous navigation component 1136 may be acquired using a rolling shutter and subsequently may be processed to mitigate image artifacts.

One or more microphones 1020 may be configured to acquire information indicative of sound present in the environment 302. In some implementations, arrays of microphones 1020 may be used. These arrays may implement beamforming techniques to provide for directionality of gain. The autonomously motile device 110 may use the one or more microphones 1020 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 302 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 49° at a second time. The sensors 1054 may include a radar 1178. The radar 1178 may be used to provide information as to a distance, lateral position, and so forth, to an object. The sensors 1054 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 302 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light 258 may be used to emit photons. A speaker 1012 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214. In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each. One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 1200 as described herein, are illustrative, and may be located as a stand-alone device or may be included, in whole or in part, as a component of a larger device or system.

FIG. 12 is a block diagram conceptually illustrating example components of a system 1200, such as remote server, which may assist with processing data output by the noise-suppression component 430, such as ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 1200 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 1200, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

Figure 13:
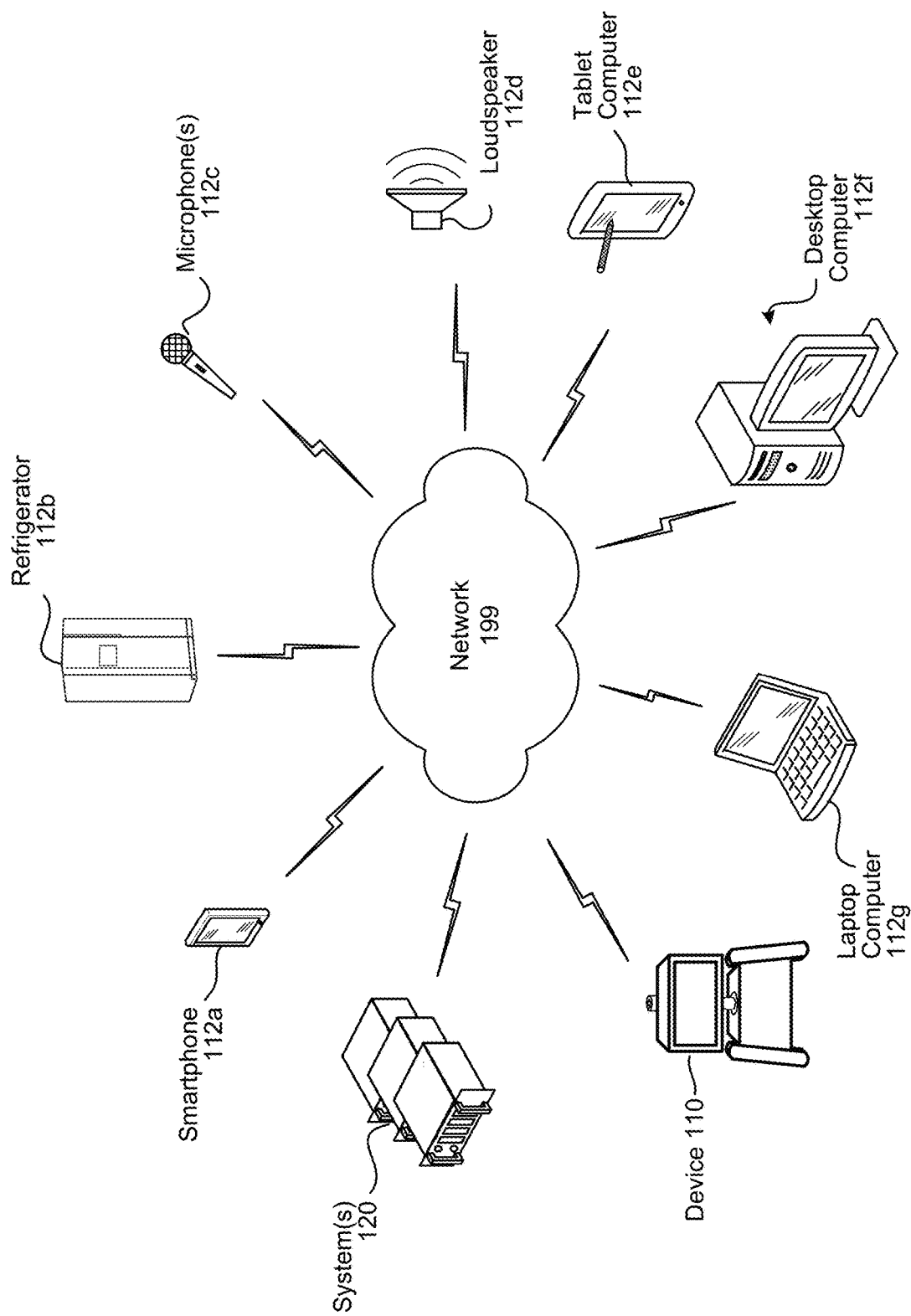
FIG. 13 illustrates a network that includes an autonomously motile device according to embodiments of the present disclosure.

As illustrated in FIG. 13 and as discussed herein, the autonomously motile device 110 may communicate, using the network 199, with the system 1200 and/or a user device. The network(s) 199 may include a local or private network or may include a wide network such as the Internet. The devices may be connected to the network(s) 199 through either wired or wireless connections. Example user devices include a cellular phone 112*a*, a refrigerator 112*b*, a microphone 112*c*, a loudspeaker 112*d*, a tablet computer 112*e*, a desktop computer 112*f*, and a laptop computer 112*g*, which may be connected to the network(s) 199 through a wireless service provider, over a Wi-Fi or cellular network connection, or the like. Other devices are included as network-connected support devices, such as the system(s) 1200, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, i, should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash memory, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for suppressing noise in received audio using an autonomously motile device, the method comprising:

receiving, from a first microphone of a microphone array of the autonomously motile device, first audio data including a first representation of first speech and a first representation of first noise;

processing, using a filter, the first audio data to determine first spectrogram data comprising first real spectrogram data and first imaginary spectrogram data;

processing, using an encoder comprising at least a first convolutional layer, the first real spectrogram data and the first imaginary spectrogram data to determine first feature data representing at least a tone of the first audio data;

processing, using a recurrent layer, the first feature data to determine second feature data corresponding to the first audio data representing at least the tone of the first audio data;

processing, using a decoder comprising at least a second convolutional layer, the second feature data to determine first mask data comprising first real mask data and first imaginary mask data, the first mask data representing a reduction in energy value to be applied to the first representation of the first noise;

performing complex multiplication using the first mask data and the first spectrogram data to determine second spectrogram data comprising second real spectrogram data and second imaginary spectrogram data; and processing the second real spectrogram data and the second imaginary spectrogram data to determine second audio data including a second representation of the first speech.

2. The computer-implemented method of claim 1, wherein:
the first spectrogram data corresponds to a first frequency range and a first audio frame;
the first spectrogram data represents the first noise having a first energy value;
the second spectrogram data corresponds to the first frequency range and the first audio frame; and
the second spectrogram data represents the first noise having a second energy value less than the first energy value.

3. A computer-implemented method comprising:
receiving, from a microphone of a device, first audio data, the first audio data representing speech and noise;
determining, using the first audio data, first spectrogram data comprising first real spectrogram data and first imaginary spectrogram data;
determining, using an encoder of a first component and the first spectrogram data, first feature data corresponding to a feature of the first audio data;
determining, using a recurrent layer of the first component and the first feature data, second feature data;
determining, using the second feature data and a decoder of the first component, the decoder comprising a first convolutional neural network (CNN) layer, first mask data comprising first real mask data and first imaginary mask data, the first mask data corresponding to at least a first frequency of the noise;
determining, using the first real mask data and the first real spectrogram data, second real spectrogram data;
determining, using the first imaginary mask data and the first imaginary spectrogram data, second imaginary spectrogram data; and
determining, using the second real spectrogram data and the second imaginary spectrogram data, second audio data representing the speech.

4. The computer-implemented method of claim 3, wherein:
the first real spectrogram data corresponds to a real portion of the first audio data; and
the first imaginary spectrogram data corresponds to an imaginary portion of the first audio data.

5. The computer-implemented method of claim 3, wherein determining the second real spectrogram data and determining the second imaginary spectrogram data further comprises:
multiplying a first value of the first real mask data and a corresponding first value of the first real spectrogram data; and
multiplying a second value of the first imaginary mask data and a corresponding second value of the first imaginary spectrogram data.

6. The computer-implemented method of claim 3, further comprising:
before determining the first mask data, sending, from the device to a remote system, the first audio data; and
outputting, from the remote system, the second audio data.

7. The computer-implemented method of claim 3, wherein:
the first spectrogram data corresponds to a first frequency range and a first audio frame;
the first spectrogram data represents the noise having a first energy value;
the second real spectrogram data and the second imaginary spectrogram data correspond to the first frequency range and the first audio frame; and
the second real spectrogram data and the second imaginary spectrogram data represent the noise having a second energy value less than the first energy value.

8. The computer-implemented method of claim 3, further comprising, prior to determining the second real spectrogram data and the second imaginary spectrogram data:
determining the first spectrogram data corresponds to a first audio frame; and
determining the first mask data corresponds to the first audio frame.

9. The computer-implemented method of claim 3, further comprising:
after determining the second real spectrogram data and the second imaginary spectrogram data, determining that the device is moving in an environment; and
after determining that the device is moving, sending, to a second component, a signal to stop using the first mask data.

10. The computer-implemented method of claim 3, further comprising:
after determining the second real spectrogram data and the second imaginary spectrogram data, determining that the device is stationary;
determining third audio data corresponding to a first direction relative to the device;
determining fourth audio data corresponding to a second direction relative to the device;
determining that the third audio data includes a first representation of the speech;
determining that the fourth audio data includes a second representation of the noise; and
processing the third audio data and the fourth audio data to determine fifth audio data corresponding to the speech.

11. A device comprising:
at least one processor; and
at least one memory including instructions that, when executed by the at least one processor, cause the device to:
receive, from a microphone of the device, first audio data, the first audio data representing speech and noise;
determine, using the first audio data, first spectrogram data comprising first real spectrogram data and first imaginary spectrogram data;
determine, using an encoder of a first component and the first spectrogram data, first feature data corresponding to a feature of the first audio data;
determine, using a recurrent layer of the first component and the first feature data, second feature data;
determine, using the second feature data and a decoder of the first component, the decoder comprising a first convolutional neural network (CNN) layer, first mask data comprising first real mask data and first imaginary mask data, the first mask data corresponding to at least a first frequency of the noise;
determine, using the first real mask data and the first real spectrogram data, second real spectrogram data;

determine, using the first imaginary mask data and the first imaginary spectrogram data, second imaginary spectrogram data; and determine, using the second real spectrogram data and the second imaginary spectrogram data, second audio data representing the speech.

12. The device of claim 11, wherein:

the first real spectrogram data corresponds to a real portion of the first audio data; and the first imaginary spectrogram data corresponds to an imaginary portion of the first audio data.

13. The device of claim 11, instructions that cause the device to determine the second real spectrogram data and determine the second imaginary spectrogram data comprise instructions that, when executed by the at least one processor, further cause the device to:

multiply a first value of the first real mask data and a corresponding first value of the first real spectrogram data; and multiply a second value of the first imaginary mask data and a corresponding second value of the first imaginary spectrogram data.

14. The device of claim 11, wherein the at least one memory further comprises instructions that, when executed by the at least one processor, further cause the device to:

before determining the first mask data, send, from the device to a remote system, the first audio data; and output, from the remote system, the second audio data.

15. The device of claim 11, wherein:

the first spectrogram data corresponds to a first frequency range and a first audio frame;

the first spectrogram data represents the noise having a first energy value;

the second real spectrogram data and the second imaginary spectrogram data correspond to the first frequency range and the first audio frame; and the second real spectrogram data and the second imaginary spectrogram data represent the noise having a second energy value less than the first energy value.

16. The device of claim 11, wherein the at least one memory further comprises instructions that, when executed by the at least one processor, further cause the device to, prior to determination of the second real spectrogram data and the second imaginary spectrogram data:

determine the first spectrogram data corresponds to a first audio frame; and determine the first mask data corresponds to the first audio frame.

17. The device of claim 11, wherein the at least one memory further comprises instructions that, when executed by the at least one processor, further cause the device to:

after determining the second real spectrogram data and the second imaginary spectrogram data, determine that the device is moving in an environment; and after determining that the device is moving, send, to a second component, a signal to stop using the first mask data.

18. The device of claim 11, wherein the at least one memory further comprises instructions that, when executed by the at least one processor, further cause the device to:

after determining the second real spectrogram data and the second imaginary spectrogram data, determine that the device is stationary;

determine third audio data corresponding to a first direction relative to the device;

determine fourth audio data corresponding to a second direction relative to the device;

determine that the third audio data includes a first representation of the speech;

determine that the fourth audio data includes a second representation of the noise; and processing the third audio data and the fourth audio data to determine fifth audio data corresponding to the speech.

* * * * *